United States Patent
Hoshino

(10) Patent No.: US 9,961,214 B2
(45) Date of Patent: May 1, 2018

(54) IMAGE SHOOTING APPARATUS FOR ADDING INFORMATION TO IMAGE

(71) Applicant: CASIO COMPUTER CO., LTD., Shibuya-ku, Tokyo (JP)

(72) Inventor: Hiroyuki Hoshino, Hamura (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 71 days.

(21) Appl. No.: 15/071,377

(22) Filed: Mar. 16, 2016

(65) Prior Publication Data
US 2016/0366290 A1   Dec. 15, 2016

(30) Foreign Application Priority Data

Jun. 11, 2015  (JP) .................................. 2015-118243
Dec. 24, 2015  (JP) .................................. 2015-252315

(51) Int. Cl.
*H04N 1/00* (2006.01)
*H04N 1/32* (2006.01)

(52) U.S. Cl.
CPC ..... *H04N 1/00225* (2013.01); *H04N 1/00103* (2013.01); *H04N 1/32128* (2013.01); *H04N 2201/0055* (2013.01); *H04N 2201/0084* (2013.01); *H04N 2201/3228* (2013.01); *H04N 2201/3252* (2013.01)

(58) Field of Classification Search
CPC .......... H04N 1/00225; H04N 1/00103; H04N 1/32128; H04N 2201/0084; H04N 2201/0055; H04N 2201/3228; H04N 2201/3252; H04N 2201/3253; H04N 21/422; H04N 21/4104; G06F 3/01

USPC ..................................................... 348/207.1
See application file for complete search history.

(56) References Cited

U.S. PATENT DOCUMENTS

| 7,098,943 | B2 * | 8/2006 | Shibutani | ............ H04N 1/00347 348/207.11 |
| 9,325,770 | B2 * | 4/2016 | Cho | ....................... G06F 9/4445 |
| 9,554,027 | B2 * | 1/2017 | Wu | ..................... H04N 5/23206 |

(Continued)

FOREIGN PATENT DOCUMENTS

| JP | 2001-358978 | 12/2001 |
| JP | 2006-086927 | 3/2006 |

(Continued)

OTHER PUBLICATIONS

Japanese Office Action for Japanese Patent Application No. 2015-252315 dated Nov. 22, 2016.

*Primary Examiner* — Pritham Prabhakher
(74) *Attorney, Agent, or Firm* — Amin, Turocy & Watson LLP; Gregory Turocy

(57) ABSTRACT

According to an embodiment of the present invention, an image shooting apparatus includes an imaging unit, a transmission unit, and a processor that is configured to acquire an image captured by the imaging unit to generate a shot image and control the transmission unit to transmit, to an information acquiring apparatus, (i) the shot image, and (ii) instruction information for instructing the information acquiring apparatus to acquire supplementary information, with a shooting instruction. The supplementary information is information which is acquired by a sensor of the information acquiring apparatus and which is to be added to the transmitted shot image.

21 Claims, 13 Drawing Sheets

(56) References Cited

U.S. PATENT DOCUMENTS

| | | | | |
|---|---|---|---|---|
| 2002/0101619 | A1* | 8/2002 | Tsubaki | G06F 17/30265 358/302 |
| 2004/0223057 | A1* | 11/2004 | Oura | H04N 1/00204 348/207.1 |
| 2008/0297608 | A1* | 12/2008 | Border | H04N 1/00204 348/207.11 |
| 2011/0273570 | A1* | 11/2011 | Sakaki | H04N 5/23203 348/207.11 |
| 2012/0050549 | A1* | 3/2012 | Maekawa | H04N 1/00153 348/207.1 |
| 2012/0233531 | A1* | 9/2012 | Ma | G06F 17/30265 715/205 |
| 2013/0178163 | A1* | 7/2013 | Wang | H04W 4/008 455/41.2 |
| 2014/0032551 | A1* | 1/2014 | Matsuda | G06F 17/30722 707/736 |
| 2014/0240575 | A1* | 8/2014 | Kaneda | H04N 1/32101 348/333.01 |
| 2014/0317529 | A1* | 10/2014 | Oikawa | H04N 1/32101 715/748 |
| 2015/0121535 | A1* | 4/2015 | Fiss | G06F 21/6218 726/26 |
| 2015/0243067 | A1* | 8/2015 | Ishikawa | G06F 3/01 345/473 |
| 2015/0381874 | A1* | 12/2015 | Wu | H04N 5/23206 348/211.2 |

FOREIGN PATENT DOCUMENTS

| | | |
|---|---|---|
| JP | 2008-072228 | 3/2008 |
| JP | 2008-252212 | 10/2008 |
| JP | 2009-027647 | 2/2009 |
| JP | 2012-50012 | 3/2012 |
| JP | 2012-186732 | 9/2012 |
| JP | 2013-223153 | 10/2013 |
| JP | 2014-045459 | 3/2014 |
| JP | 2015-002416 | 1/2015 |

* cited by examiner

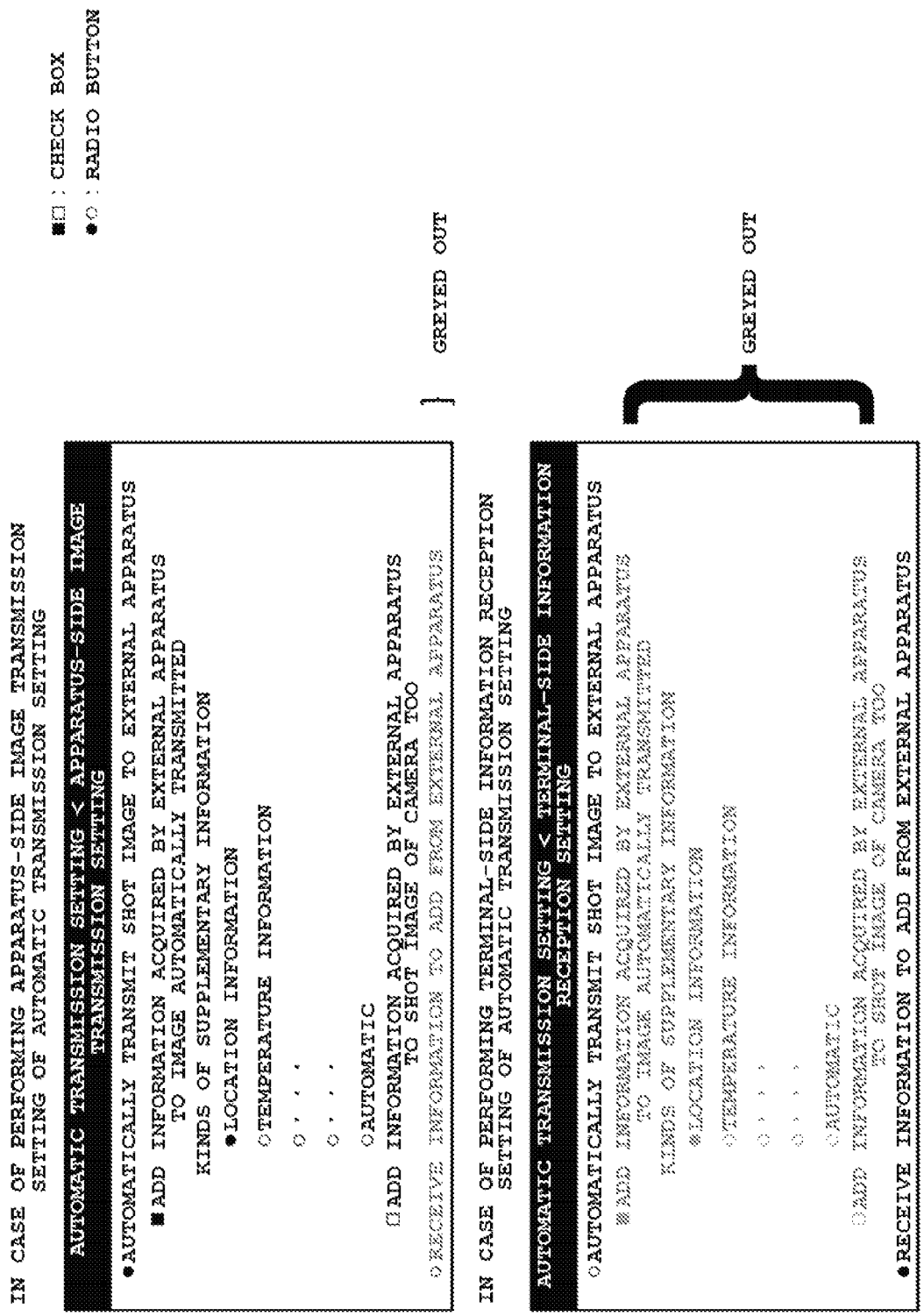

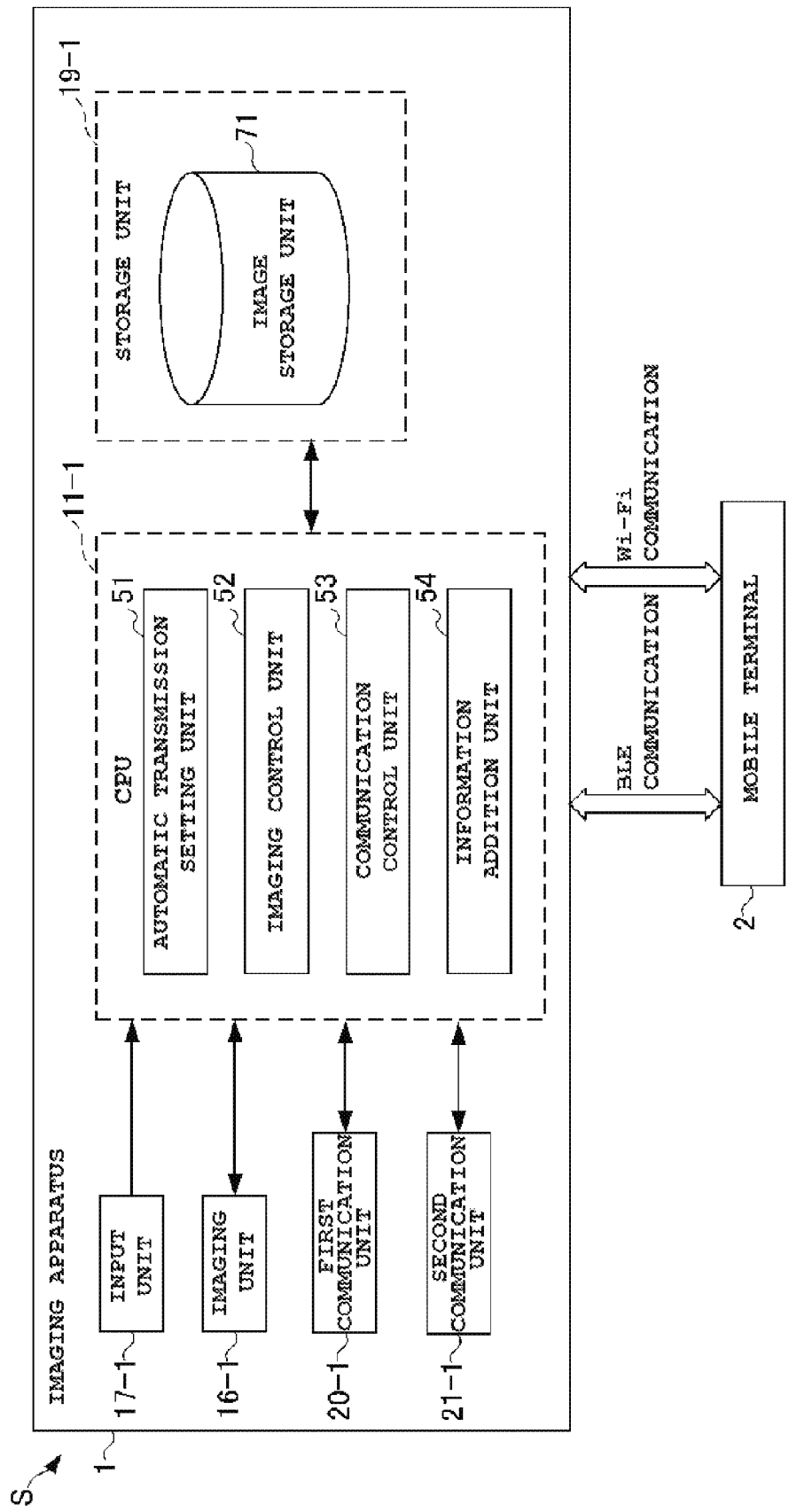

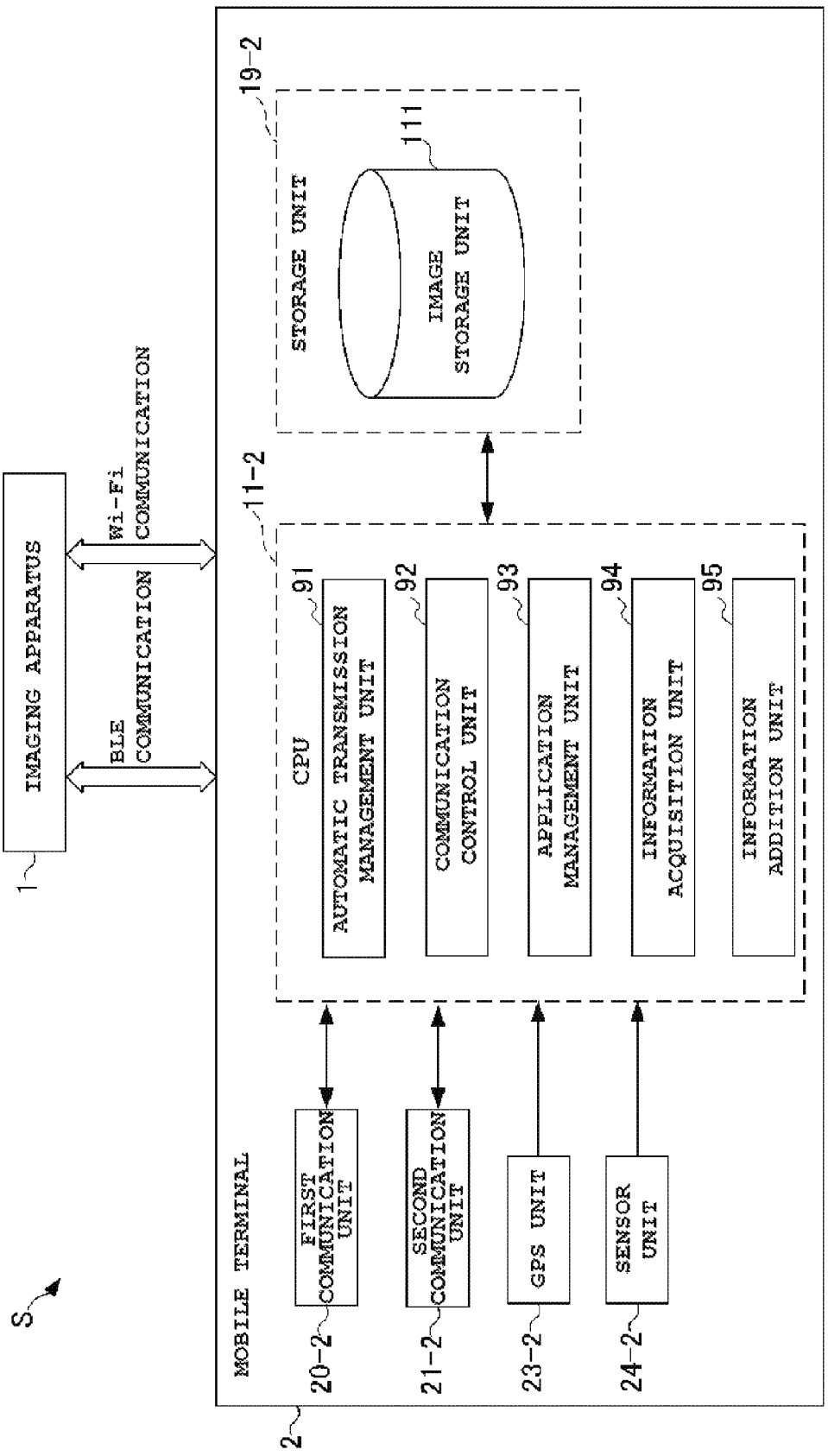

IMAGE SHOOTING APPARATUS FOR ADDING INFORMATION TO IMAGE

CROSS-REFERENCE TO RELATED APPLICATIONS

This application is based upon and claims the benefit of priority under 35 USC 119 of Japanese Patent Application No. 2015-118243 filed on Jun. 11, 2015 and Japanese Patent Application No. 2015-252315 filed on Dec. 24, 2015 the entire disclosure of which, including the description, claims, drawings, and abstract, is incorporated herein by reference in their entirety for all purposes.

BACKGROUND OF THE INVENTION

1. Field of the Invention

The present invention relates to an image shooting apparatus, an information acquiring apparatus, an information acquiring system, a transmission control method, and an information acquiring method.

2. Description of the Related Art

Conventionally, there has been known a technology for automatically transmitting an image shot by an image shooting apparatus to an external apparatus as disclosed in Japanese Patent Application Laid-Open Publication No. 2002-342465 published on Nov. 29, 2002, in order for the image to be used by the external apparatus as well as the image shooting apparatus. Further, for example, Japanese Patent Application Laid-Open Publication No. 2004-032129 published on Jan. 29, 2004 discloses a technology for adding to an image shot by an image shooting apparatus location information acquired by a GPS (Global Positioning System) receiver of the image shooting apparatus and publishing the image on a website.

SUMMARY OF THE INVENTION

According to an embodiment of the present invention, an image shooting apparatus is provided. The image shooting apparatus includes an imaging unit, a transmission unit, and a processor that is configured to acquire an image captured by the imaging unit to generate a shot image and control the transmission unit to transmit, to an information acquiring apparatus, (i) the shot image, and (ii) instruction information for instructing the information acquiring apparatus to acquire supplementary information, with a shooting instruction. The supplementary information is information which is acquired by a sensor of the information acquiring apparatus and which is to be added to the transmitted shot image.

According to an embodiment of the present invention, an information acquiring apparatus is provided. The information acquiring apparatus includes a sensor, a reception unit, and a processor that is configured to control the reception unit to receive a shot image and instruction information transmitted from an image shooting apparatus and to perform processing to acquire supplementary information by the sensor and add the supplementary information to the received shot image according to the received instruction information.

According to an embodiment of the present invention, an information acquiring system is provided. The system includes an image shooting apparatus and an information acquiring apparatus. The image shooting apparatus includes an imaging unit, a transmission unit, and a processor that is configured to acquire an image captured by the imaging unit to generate a shot image and control the transmission unit to transmit, to the information acquiring apparatus, (i) the shot image, and (ii) instruction information for instructing the information acquiring apparatus to acquire supplementary information, with a shooting instruction. The supplementary information is information which is acquired by a sensor of the information acquiring apparatus and which is to be added to the transmitted shot image. The information acquiring apparatus includes a sensor, a reception unit, and a processor that is configured to control the reception unit to receive the shot image and the instruction information transmitted from the image shooting apparatus and to perform processing to acquire supplementary information by the sensor and add the supplementary information to the received shot image according to the received instruction information.

According to an embodiment of the present invention, a transmission control method is provided. The method includes acquiring an image captured by an imaging unit to generate a shot image and controlling a transmission unit to transmit, to an information acquiring apparatus, (i) the shot image, and (ii) instruction information for instructing the information acquiring apparatus to acquire supplementary information at the time of generating the shot image, with a shooting instruction. The supplementary information is information which is acquired by a sensor of the information acquiring apparatus and which is to be added to the transmitted shot image.

According to an embodiment of the present invention, an information acquiring method is provided. The method includes controlling a reception unit to receive a shot image and instruction information transmitted from an image shooting apparatus, and performing processing to acquire supplementary information by a sensor and add the supplementary information to the received shot image according to the received instruction information.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings.

Here:

FIG. 3 is a schematic diagram for showing an example of automatic transmission setting.

FIG. 4 is a functional block diagram for showing a functional configuration of the imaging apparatus of FIG. 2A for executing an information addition process.

FIG. 5 is a functional block diagram for showing a functional configuration of the mobile terminal of FIG. 2B for executing the information addition process.

DETAILED DESCRIPTION OF THE PREFERRED EMBODIMENT

Hereinafter, embodiments of the present invention will be described with reference to the accompanying drawings. The embodiments are not intended as a definition of the limits of the invention.

<First Embodiment>

Figure 1:
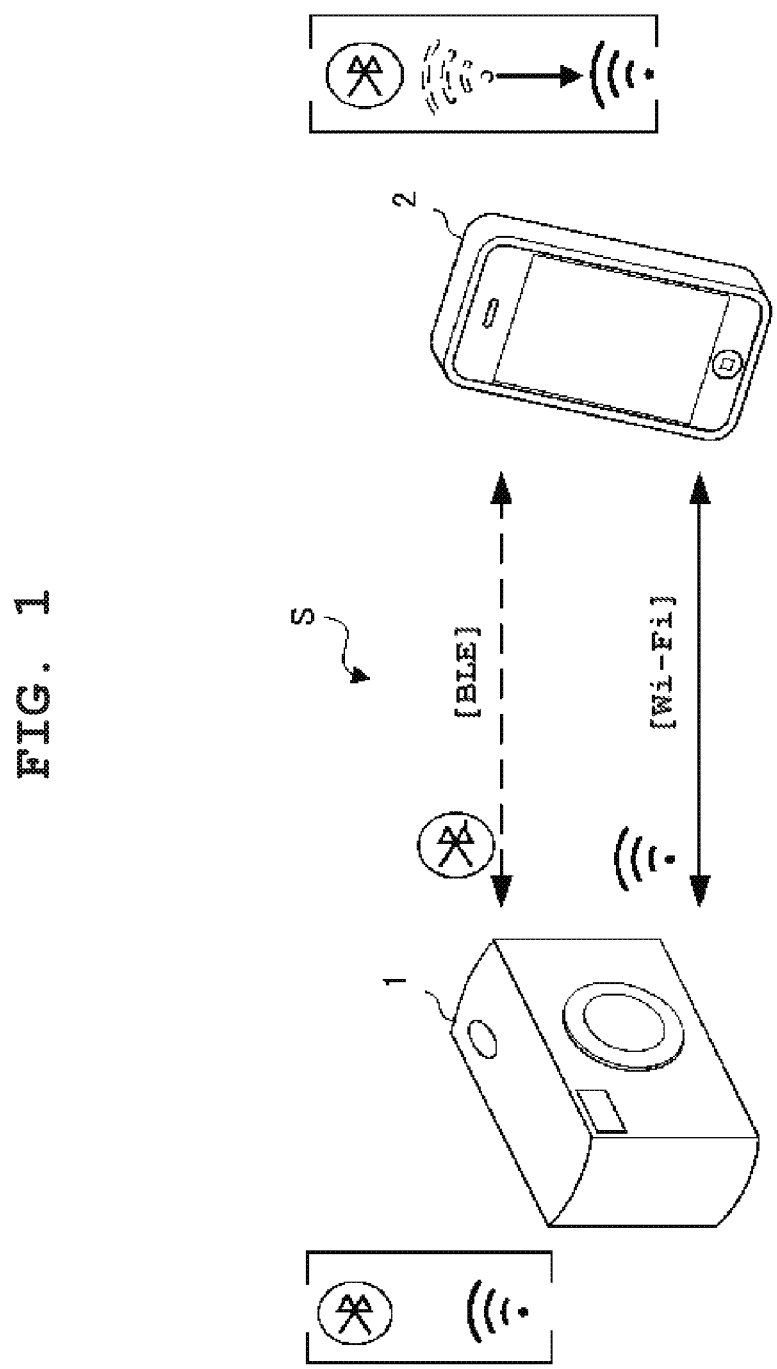
FIG. 1 is a system diagram for showing a system configuration of an information addition system according to an embodiment of the present invention.

FIG. 1 is a system diagram for showing a system configuration of an information addition system according to an embodiment of the present invention.

As shown in FIG. 1, an information addition system S includes an imaging apparatus 1 and a mobile terminal 2.

Communication between the imaging apparatus 1 and the mobile terminal 2 is performed in two ways: a first communication method uses BLE (Bluetooth low energy; "Bluetooth" is a registered trademark) which is a short range wireless communication technology offering low power consumption; and a second communication method uses Wi-Fi (Wireless Fidelity) which is a high-speed local area wireless communication technology capable of mass data communication. The imaging apparatus 1 and the mobile terminal 2 are consistently connected via BLE while connection between them via Wi-Fi is established based on an instruction of connection received from the imaging apparatus 1 via BLE when mass data should be transferred.

Figure 2A:
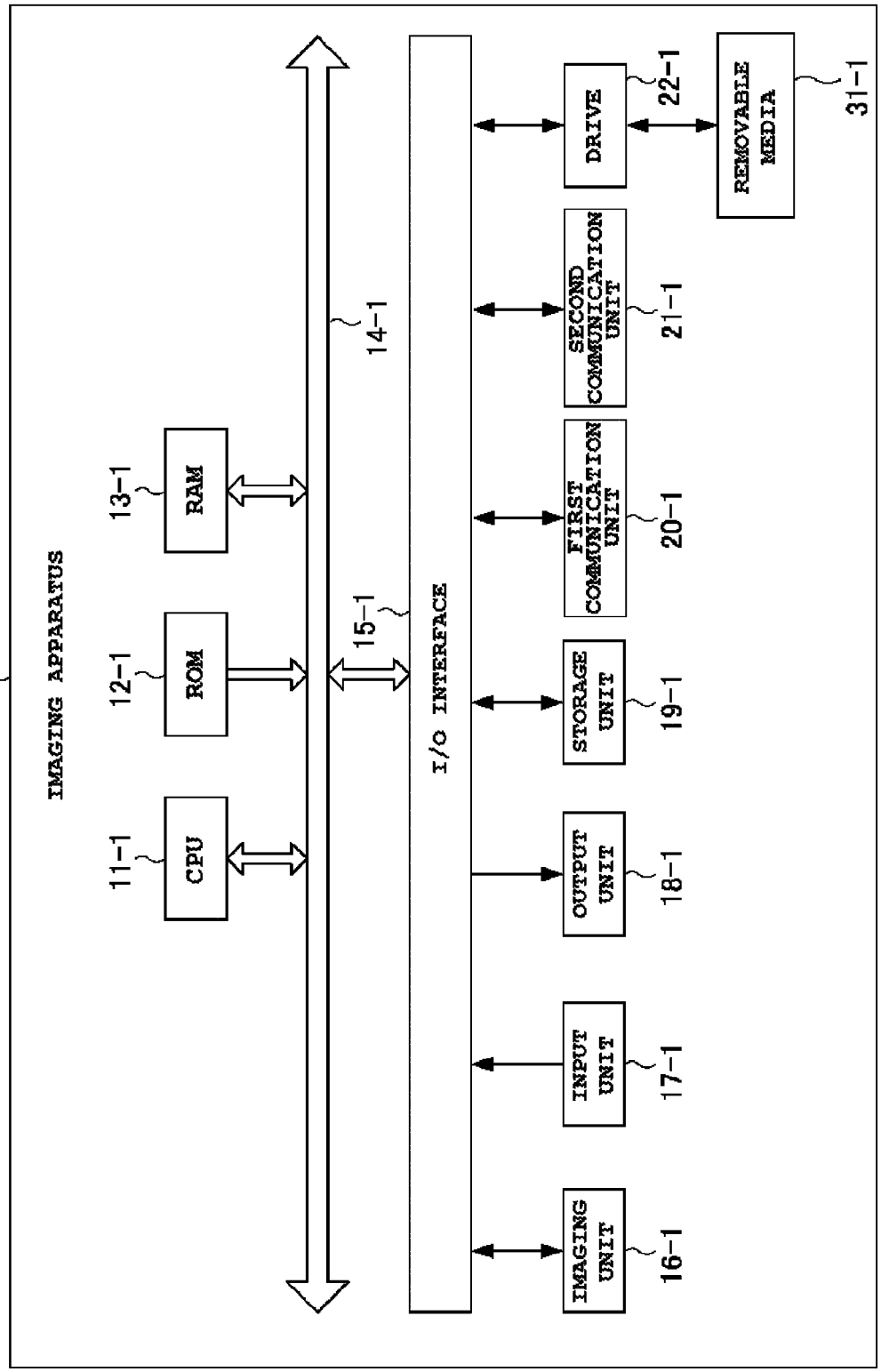
FIG. 2A is a block diagram for showing a hardware configuration of an imaging apparatus of an information addition system according to an embodiment of the present invention.
Figure 2B:
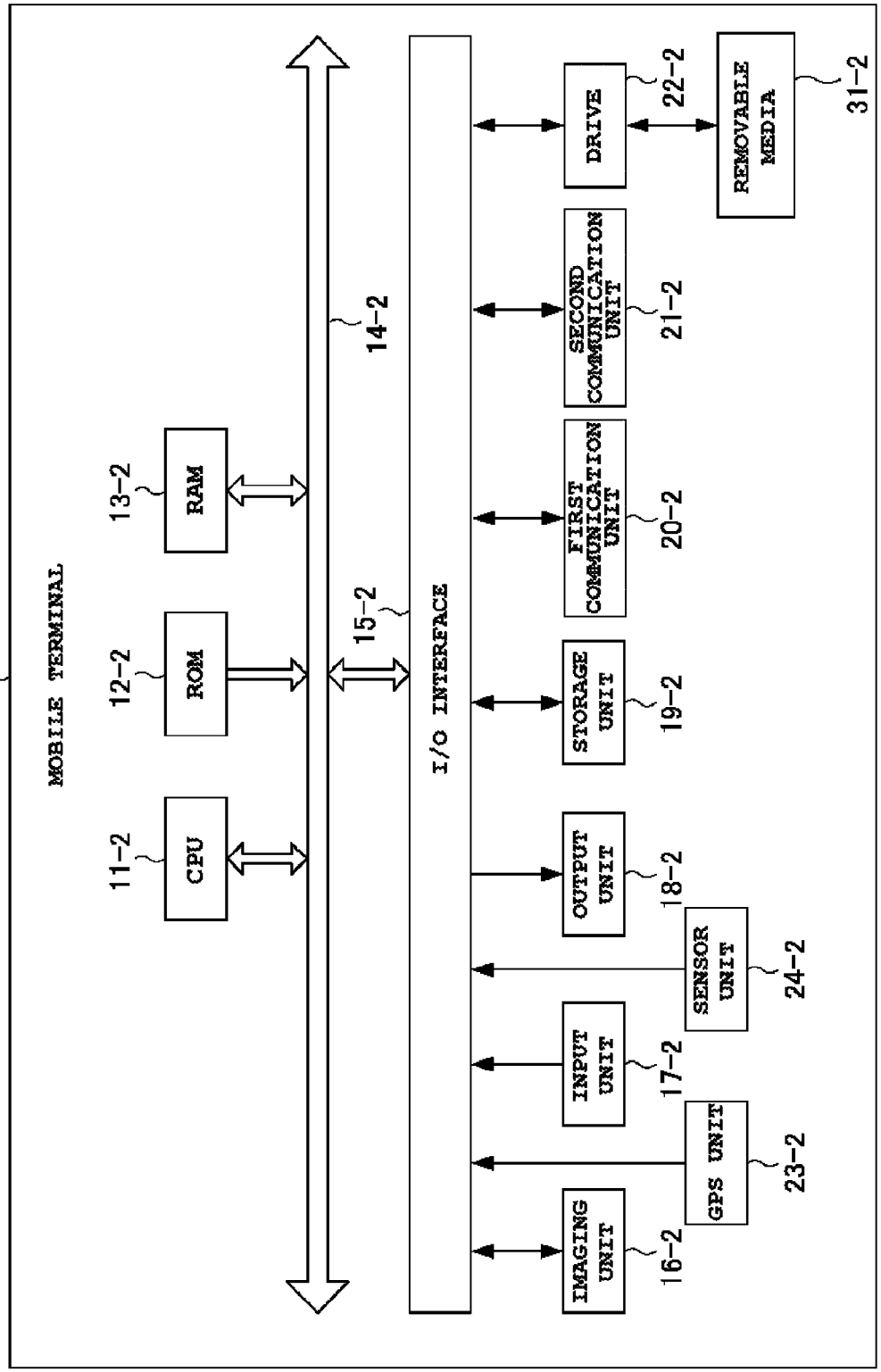
FIG. 2B is a block diagram for showing a hardware configuration of a mobile terminal of the information addition system according to the embodiment of the present invention.

FIG. 2A is a block diagram for showing a hardware configuration of the imaging apparatus 1 of the information addition system S according to an embodiment of the present invention. FIG. 2B is a block diagram for showing a hardware configuration of the mobile terminal 2 of the information addition system S according to the embodiment of the present invention.

In the following, a hardware configuration of the imaging apparatus 1 is described first. Then, a hardware configuration of the mobile terminal 2 will be described. Each of reference numerals of elements of the imaging apparatus 1 includes "-1" at its end. Each of reference numerals of elements of the mobile terminal 2 includes "-2" at its end.

For example, the imaging apparatus 1 is realized by a digital camera.

As shown in FIG. 2A, the imaging apparatus 1 includes a CPU (Central Processing Unit) 11-1, a ROM (Read Only Memory) 12-1, a RAM (Random Access Memory) 13-1, a bus 14-1, an I/O interface 15-1, an imaging unit 16-1, an input unit 17-1, an output unit 18-1, a storage unit 19-1, a first communication unit 20-1, a second communication unit 21-1, and a drive 22-1.

The CPU 11-1 executes various processes according to programs stored in the ROM 12-1 or loaded in the RAM 13-1 from the storage unit 19-1.

In the RAM 13-1, there are stored data necessary for the CPU 11 to execute various processes, and the like.

The CPU 11-1, the ROM 12-1 and the RAM 13-1 are connected to each other via the bus 14-1. The I/O interface 15-1 is also connected to the bus 14-1. The imaging unit 16-1, the input unit 17-1, the output unit 18-1, the storage unit 19-1, the first communication unit 20-1, the second communication unit 21-1, and the drive 22-1 are connected to the I/O interface 15-1.

The imaging unit 16-1 includes an optical lens unit and an image sensor (not shown in the drawing).

The optical lens unit includes lenses for collecting light to take a picture of a subject such as a focus lens and a zoom lens.

The focus lens forms an image of a subject on a light-receiving surface of the image sensor. The zoom lens freely changes the focal length within a predetermined range.

Further, the optical lens unit is provided with a peripheral circuit to adjust parameters such as focusing, exposure, and/or white balancing, as necessary.

The image sensor includes a photoelectric conversion element, an AFE (Analog Front End), and the like.

The photoelectric conversion element includes a CMOS (Complementary Metal Oxide Semiconductor) type photoelectric conversion element, for example. The subject's image is input to the photoelectric conversion element from the optical lens unit. The photoelectric conversion element performs photoelectric conversion (image capturing) of the subject's image and accumulates image signals for a predetermined period of time. The photoelectric conversion element provides the AFE with the accumulated image signals sequentially.

The AFE executes various signal processing operations such as A/D (Analog/Digital) conversion on the analog image signals. Digital signals are generated by the signal processing operations and output as output signals of the imaging unit 16-1.

The output signal of the imaging unit 16-1 is hereinafter referred to as "data of a captured image". The data of the captured image is supplied to the CPU 11-1, an image processing unit (not shown in the drawing), or the like.

The input unit 17-1 includes various buttons, and a variety of information is input via the input unit 17 in response to manipulation by a user.

The output unit 18-1 includes a display, a speaker, or the like, and outputs images or voices.

The storage unit 19-1 includes a hard disk, a DRAM (Dynamic Random Access Memory), or the like, and various image data is stored therein.

The first communication unit 20-1 controls communication with an external apparatus (in the present embodiment, the mobile terminal 2) by the first communication method of low-speed but low power consumption which suits consistent connection. In the present embodiment, the first communication method uses a communication technology based on the BLE standard.

The second communication unit 21-1 controls communication with an external apparatus (in the present embodiment, the mobile terminal 2) by the second communication method of high-speed which suits file transfer. In the present embodiment, the second communication method uses a communication technology based on the Wi-Fi standard for wireless LAN.

A removable media 31-1 including a magnetic disk, an optical disk, a magneto-optical disc, a semiconductor memory, or the like, is mounted on the drive 22-1. A program read out from the removable media 31-1 by the drive 22-1 is installed in the storage unit 19-1 as necessary. Similarly to the storage unit 19-1, the removable media 31-1 stores various data such as the image data stored in the storage unit 19-1.

The mobile terminal 2 is realized by a digital camera, for example.

As shown in FIG. 2B, the mobile terminal 2 includes a GPS unit 23-2 and a sensor unit 24-2 in addition to hardware elements similar to those described above (a CPU 11-2, a ROM 12-2, a RAM 13-2, a bus 14-2, an I/O interface 15-2, an imaging unit 16-2, an input unit 17-2, an output unit 18-2, a storage unit 19-2, a first communication unit 20-2, a second communication unit 21-2, a drive 22-2, and a removable media 31-2). The GPS unit 23-2 and the sensor unit 24-2 are connected to the I/O interface 15-2.

The GPS unit 23-2 receives GPS signals from a plurality of GPS satellites via a GPS receiver antenna. The CPU 11-2 acquires information on latitude, longitude, and altitude (hereinafter, referred to as "location information") showing the present location of an apparatus (in this case, the mobile terminal 2) based on the GPS signals received by the GPS unit 23-2.

The sensor unit 24-2 may include various sensors such as a temperature sensor, a pressure sensor, and an acceleration sensor.

Descriptions of the hardware of the mobile terminal 2 similar to that of the imaging apparatus 1 are omitted. In other words, descriptions of the elements of FIG. 2B each of which has the same name as one of the imaging apparatus 1 (i.e. the CPU 11-2, the ROM 12-2, the RAM 13-2, the bus 14-2, the I/O interface 15-2, the imaging unit 16-2, the input unit 17-2, the output unit 18-2, the storage unit 19-2, the first communication unit 20-2, the second communication unit 21-2, the drive 22-2, and the removable media 31-2) are omitted.

The information addition system S configured as described above has a function to add information acquired by the GPS unit 23-2 or the sensor unit 24-2 of the mobile terminal 2 (hereinafter, referred to as "supplementary information") to an image shot by the imaging apparatus 1.

The present embodiment is based on the premise that the imaging apparatus 1 and the mobile terminal 2 exist in the same environment. The mobile terminal 2 acquires various kinds of sensor information such as location information or temperature information which is image shooting environment of the imaging apparatus 1. The acquired information is added to a corresponding image as the supplementary information.

More specifically, in the information addition system S of the present embodiment, the imaging apparatus 1 and the mobile terminal 2 are connected via Wi-Fi for high-speed communication for image transmission and via BLE for control information exchange which offers low power consumption and enables consistent connection.

With a shooting instruction, the imaging apparatus 1 instructs, via BLE, the mobile terminal 2 to acquire the sensor information at the time of the shooting instruction.

Then, Wi-Fi connection is established and an image shot by the imaging apparatus 1 is transmitted to the mobile terminal 2. At the mobile terminal, the sensor information is added to the image. Further, identification information for identifying an image to which the supplementary information is to be added such as a file name of the image is transmitted from the imaging apparatus 1 together with the instruction to acquire the sensor information at the time of the shooting instruction. At the mobile terminal 2, the image to which the supplementary information is to be added is specified based on the identification information and the supplementary information is added to the image.

In the case that the image is not transmitted from the imaging apparatus 1, the mobile terminal 2 transmits the supplementary information to the imaging apparatus 1 via BLE and the imaging apparatus 1 acquires the supplementary information and adds the supplementary information to the image.

In the present embodiment, whether or not to transmit image from the imaging apparatus 1 and/or which kind of sensor information to acquire is determined according to setting.

In the following, an example of automatic transmission setting for images according to the embodiment will be described.

FIG. 3 is a schematic diagram for showing an example of the automatic transmission setting. In the drawing, □ shows that a check box is not selected, ■ shows that a check box is selected, ○ shows that a radio button is not selected, and ● shows that a radio button is selected. Further, items which cannot be selected are greyed out.

In the present embodiment, setting for cooperation of the imaging apparatus 1 and an external apparatus (in the present embodiment, the mobile terminal 2) can be performed.

The automatic transmission setting is divided into apparatus-side image transmission setting and terminal-side information reception setting.

In the case that the apparatus-side image transmission setting of the automatic transmission setting has been performed, the external apparatus can be controlled to acquire the sensor information when shooting an image to be automatically transmitted and add the acquired sensor information to the image as the supplementary information as shown in FIG. 3. In this case, the kind of information to be acquired by the external apparatus can be selected in addition to whether or not the setting is performed. Further, additional setting may be performed to instruct the external apparatus to transmit the supplementary information to the apparatus and to add the received supplementary information to shooting information in the apparatus. By this, it is possible to make the image in the transmission source match the image stored in the external apparatus to which the supplementary information has been added.

In the case that the terminal-side information reception setting of the automatic transmission setting has been performed, the imaging apparatus 1 can be controlled to automatically receive the sensor information acquired from the external apparatus as the supplementary information.

More specifically, in the example of FIG. 3, in the case of performing the apparatus-side image transmission setting of the automatic transmission setting, the options "automatically transmit shot image to external apparatus" and "add information acquired by external apparatus to image automatically transmitted" are selected and one or more kinds of the supplementary information are selected. In this example, "location information" is selected. Further, the external apparatus is instructed to transmit the supplementary information and the apparatus adds the received supplementary information to the shooting information in the case of selecting "add information acquired by external apparatus to image of camera too".

In the case of performing the terminal-side information reception setting of the automatic transmission setting, the option "receive information to add from external apparatus" is selected.

FIG. 4 is a functional block diagram for showing a functional configuration of the imaging apparatus 1 for executing an information addition process.

The information addition process means a series of actions taken in order to add to supplementary information at the time of shooting an image to the image. In the information addition process, in the case that the apparatus-side image transmission setting of the automatic transmission setting has been performed, the mobile terminal 2 acquires information (the supplementary information) at the time of shooting an image, the image is automatically transmitted from the imaging apparatus 1, and the acquired information is added to the image. On the other hand, in the case that the terminal-side information reception setting of the automatic transmission setting has been performed, the mobile terminal 2 acquires the sensor information (the supplementary information) at the time of shooting an image and transmits the acquired image to the imaging apparatus 1 and the imaging apparatus 1 adds the information to the image.

In the case that the information addition process is executed at the imaging apparatus 1, an automatic transmission setting unit 51, an imaging control unit 52, a communication control unit 53, and an information addition unit 54 of the CPU 11-1 function as shown in FIG. 4.

In an area of the storage unit 19-1, an image storage unit 71 is configured.

In the image storage unit 71, image data acquired from the imaging unit 16-1 is stored.

The automatic transmission setting unit 51 performs the automatic transmission setting (the apparatus-side image transmission setting and the terminal-side information reception setting) according to setting manipulation input by a user through the input unit 17-1. The automatic transmission setting unit 51 determines a setting state of the automatic transmission setting. Further, the automatic transmission setting unit 51 generates information of setting of the automatic transmission setting for the mobile terminal 2 (hereinafter, referred to as "setting information") according to how the user sets. By generating and transmitting setting details of the automatic transmission setting for the mobile terminal 2 by the automatic transmission setting unit 51, the user does not have to perform detailed setting manipulation and operations relating to automatic transmission can be automatically performed.

The imaging control unit 52 controls the imaging unit 16-1 to execute an image shooting process based on manipulation to instruct shooting input by the user through the input unit 17-1. The imaging control unit 52 acquires an image (hereinafter, referred to as the "shot image") from the imaging unit 16-1.

The communication control unit 53 controls the first communication unit 20-1 and the second communication unit 21-1 to perform communication according to the setting of automatic transmission.

More specifically, the communication control unit 53 controls the first communication unit 20-1 to transmits various instructions (such as an application launch instruction or a location information acquisition trigger), information for finding a corresponding image (hereinafter, referred to as "shot image information"), and the setting information of the automatic transmission setting to the mobile terminal 2, and/or establish communication with the mobile terminal 2 via Wi-Fi by the second communication unit 21-1. Further, in the case that the communication via Wi-Fi is established, the communication control unit 53 controls the second communication unit 21-1 to transmit an image.

The location information acquisition trigger includes an instruction to add the location information to the image for the apparatus-side image transmission setting, and an instruction to transmit the shot image information and the location information, which is corresponding supplementary information, to the imaging apparatus 1 for the terminal-side information reception setting, as well as an instruction to acquire the location information.

The information addition unit 54 adds the supplementary information which has been acquired in response to the location information acquisition trigger (for example, the location information) and received with the shot image information (in the present embodiment, the file name of the image) to an image corresponding to the shot image information (which has the same file name).

FIG. 5 is a functional block diagram for showing a functional configuration of the mobile terminal 2 for executing the information addition process.

In the case that the information addition process is executed at the mobile terminal 2, an automatic transmission management unit 91, a communication control unit 92, an application management unit 93, an information acquisition unit 94, and an information addition unit 95 of the CPU 11-2 function as shown in FIG. 5.

In an area of the storage unit 19-2, an image storage unit 111 is configured.

In the image storage unit 111, image data acquired from the imaging apparatus 1 is stored.

The automatic transmission management unit 91 manages setting in order for the communication control unit 92 to operate based on the setting information transmitted from the imaging apparatus 1.

The communication control unit 92 controls the first communication unit 20-2 and the second communication unit 21-2 to perform communication according to the setting of automatic transmission. More specifically, the communication control unit 92 controls the first communication unit 20-2 to transmit/receive various kinds of information (such as the application launch instruction, the location information acquisition trigger, the shot image information, the setting information, or the supplementary information) to/from the imaging apparatus 1 via BLE. Further, the communication control unit 92 controls the second communication unit 21-2 to establish communication with the imaging apparatus 1 via Wi-Fi and/or receive an image shot by the imaging apparatus 1 via Wi-Fi.

The application management unit 93 manages launch and operations of a predetermined application (hereinafter, simply the "application").

The information acquisition unit 94 acquires the sensor information such as the location information from the GPS unit 23-2 or the temperature information from the sensor unit 24-2.

The information addition unit 95 adds, to an image of images automatically transmitted from the imaging apparatus 1 which corresponds to the shot image information (in the present embodiment, the file name of an image) received with the location information acquisition trigger (i.e. the image has the same file name), the supplementary information (for example, the location information).

Figure 6:
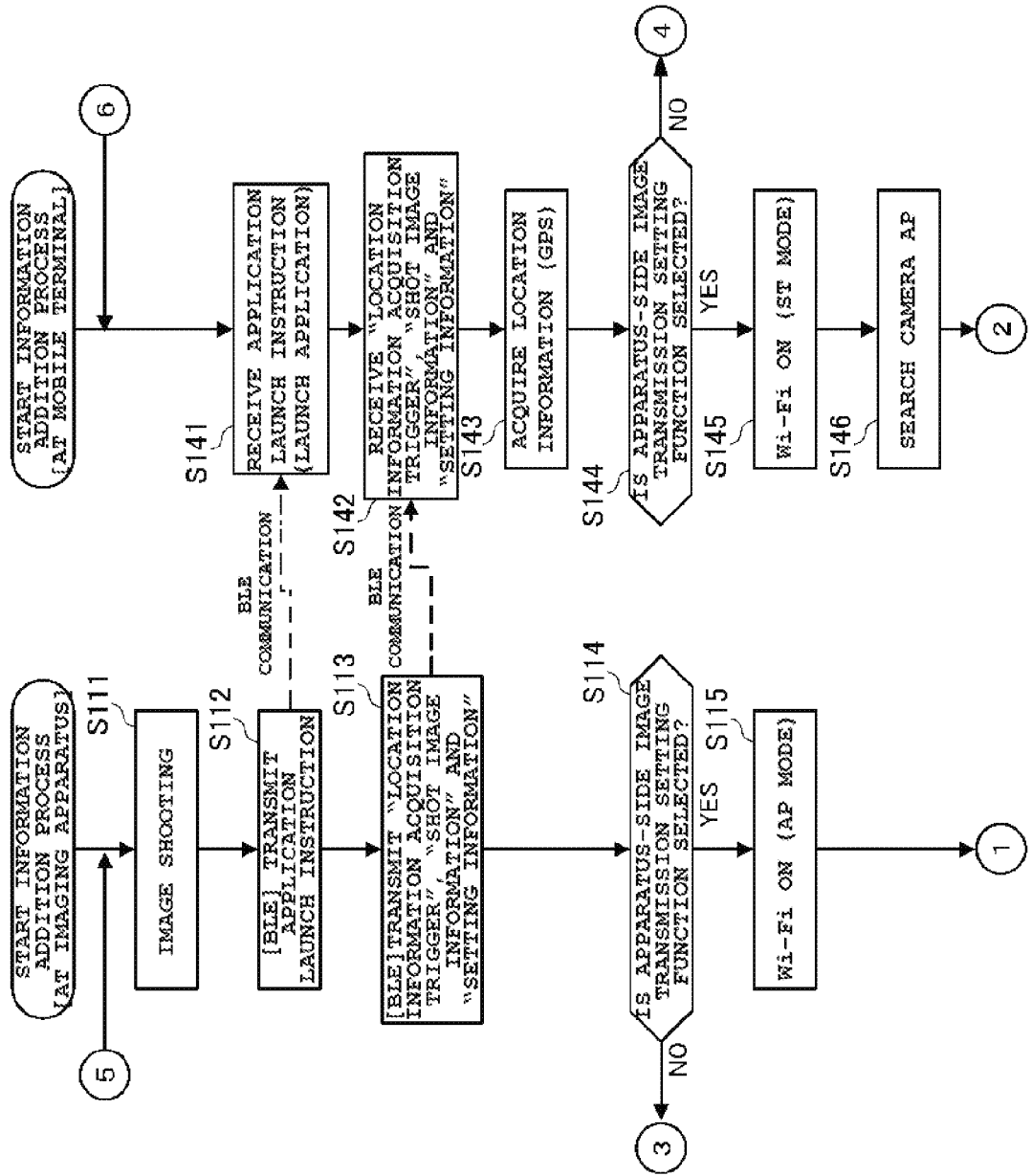
FIG. 6 is a flow chart for showing steps of the information addition process executed by the imaging apparatus of FIG. 2A and the mobile terminal of FIG. 2B including the functional configurations shown in FIGS. 4 and 5, respectively.
Figure 7:
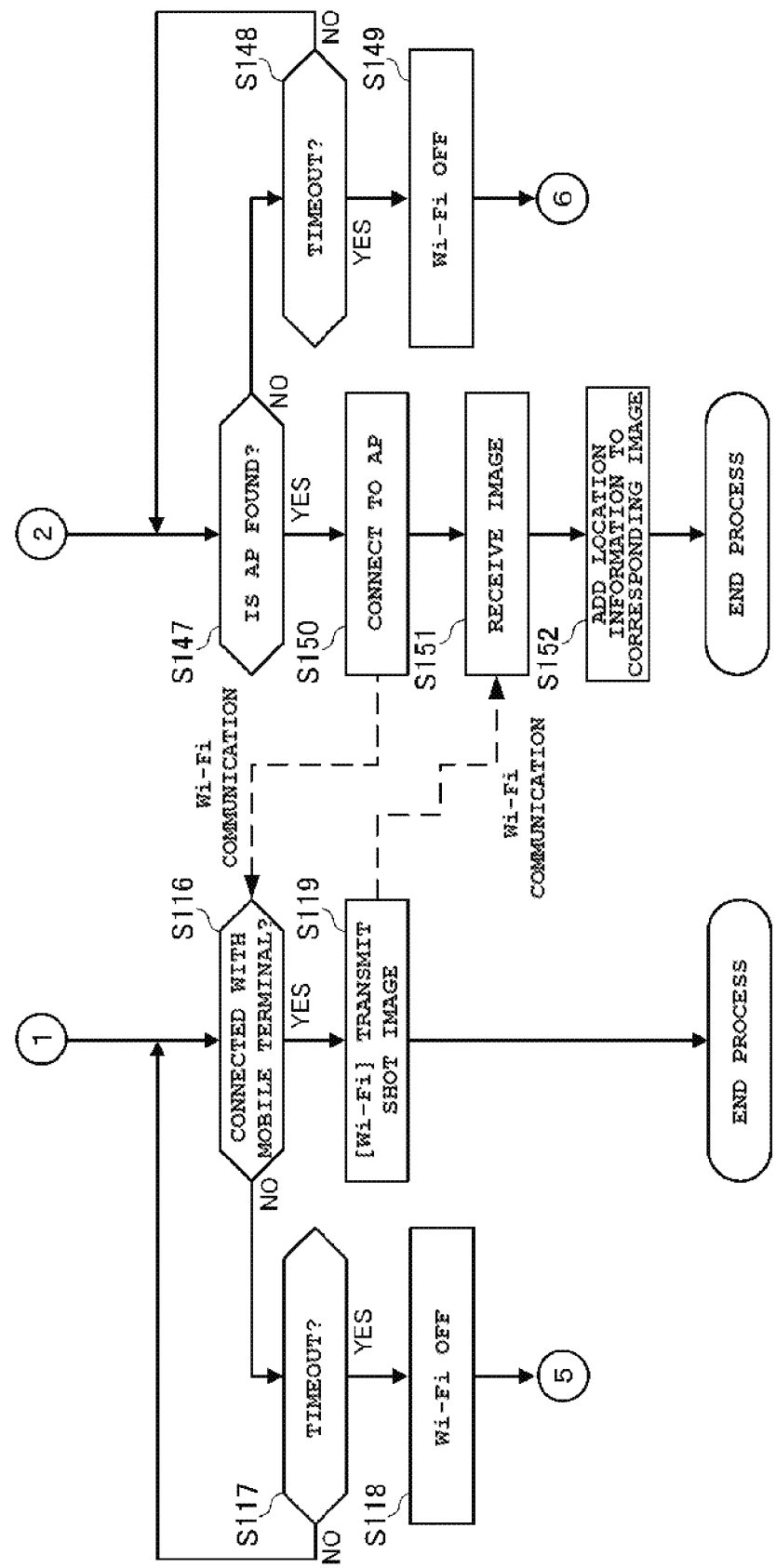
FIG. 7 is a flow chart for showing steps of the information addition process executed by the imaging apparatus of FIG. 2A and the mobile terminal of FIG. 2B including the functional configurations shown in FIGS. 4 and 5, respectively.
Figure 8:
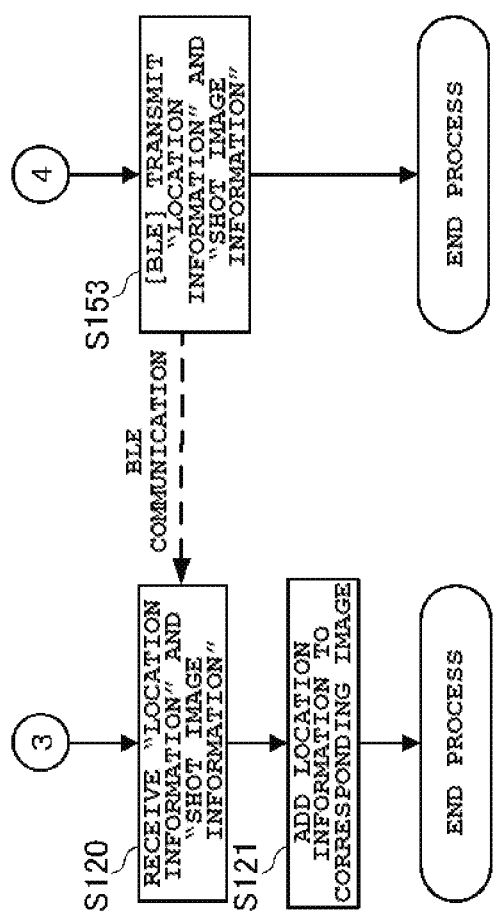
FIG. 8 is a flow chart for showing steps of the information addition process executed by the imaging apparatus of FIG. 2A and the mobile terminal of FIG. 2B including the functional configurations shown in FIGS. 4 and 5, respectively.

FIGS. 6 to 8 are flow charts for showing steps of the information addition process executed by the imaging apparatus 1 of FIG. 2A including the functional configuration shown in FIG. 4 and the mobile terminal 2 of FIG. 2B including the functional configuration shown in FIG. 5.

Before the information addition process starts, pairing between the imaging apparatus 1 and the mobile terminal 2 via BLE is completed and thus they are consistently connected via BLE. While the second communication method using the Wi-Fi technology is inactive (i.e. an off state) then, the imaging apparatus 1 and the mobile terminal 2 acquire Wi-Fi configuration (i.e. a profile) of each other and are prepared to easily establish one-to-one communication connection when Wi-Fi communication is started.

According to the setting manipulation input by the user through the automatic transmission setting screen as shown in FIG. 3 and the input unit 17-1, the automatic transmission setting unit 51 of the imaging apparatus 1 performs the apparatus-side image transmission setting or the terminal-side information reception setting. In the case that the apparatus-side image transmission setting has been performed, the image shot by the imaging apparatus 1 is transmitted to the mobile terminal 2 and the supplementary information acquired by the mobile terminal 2 (for example, the location information) is added to the image transmitted from the imaging apparatus 1. In the case that the terminal-side information reception setting has been performed, the supplementary information acquired by the mobile terminal 2 (for example, the location information) is transmitted to the imaging apparatus 1 and added to the image by the imaging apparatus 1. Further, the automatic transmission setting unit 51 of the imaging apparatus 1 generates the setting information for the mobile terminal 2 according to the setting performed at the imaging apparatus 1.

<Information Addition Process at Imaging Apparatus 1>

At Step S111, the imaging control unit 52 controls the imaging unit 16-1 to execute the image shooting process in response to the image shooting instruction. As a result, a captured image is output from the imaging unit 16-1. Imaging processing is performed for the output captured image and a shot image resulting from the imaging processing is stored in the image storage unit 71.

At Step S112, the communication control unit 53 controls the first communication unit 20-1 to communicate with the mobile terminal 2 by the first communication method using the BLE technology and to transmit the application launch instruction. Thus, the application is launched at the mobile terminal 2.

At Step S113, the communication control unit 53 controls the first communication unit 20-1 to transmit the location information acquisition trigger which is an instruction to acquire the location information and add the acquired location information to the image as the supplementary information, the shot image information (in the present embodiment, the file name of the image), and the setting information for the automatic transmission setting generated by the automatic transmission setting unit 51.

At Step S114, the automatic transmission setting unit 51 determines whether or not the apparatus-side image transmission setting function is selected.

In the case that the apparatus-side image transmission setting function is selected, the determination at Step S114 is "YES" and the process proceeds to Step S115.

At Step S115, the communication control unit 53 controls the second communication unit 21-1 to turn on Wi-Fi at the AP (Access Point) mode.

At Step S116, the communication control unit 53 determines whether or not connection via Wi-Fi with the mobile terminal 2 has been made by the second communication unit 21-1. The communication control unit 53 makes the determination by checking whether or not a notification of connection is received from the mobile terminal 2.

In the case that the connection to the mobile terminal 2 has been made, the determination at Step S116 is "YES" and the process proceeds to Step S119. Step S119 and the subsequent steps will be described later.

In the case that the connection to the mobile terminal 2 has not been made, the determination at Step S116 is "NO" and the process proceeds to Step S117.

At Step S117, the communication control unit 53 determines whether or not a predetermined period of time has elapsed and a connection timeout occurs (in other words, the elapsed time reaches a time limit).

In the case that the connection timeout does not occur, the determination at Step S117 is "NO" and the process returns to Step S116.

In the case that the connection timeout occurs, the determination at Step S117 is "YES" and the process proceeds to Step S118.

At Step S118, the communication control unit 53 turns off Wi-Fi for communication with the mobile terminal 2 by the second communication unit 21-1 and the process returns to Step S111.

At Step S119, the communication control unit 53 controls the second communication unit 21-1 to transmit the shot image to the mobile terminal 2. As a result of the transmission, the supplementary information acquired by the mobile terminal 2 (for example, the location information) is added to the shot image.

After that, the information addition process at the imaging apparatus 1 ends.

On the other hand, in the case that the apparatus-side image transmission setting function is not selected (in other words, the terminal-side information reception setting function is selected), the determination at Step S114 is "NO" and the process proceeds to Step S120.

At Step S120, the communication control unit 53 controls the first communication unit 20-1 to receive the location information and the shot image information transmitted from the mobile terminal 2.

At Step S121, the information addition unit 54 adds the supplementary information (for example, the location information) to an image stored in the image storage unit 71 which corresponds to the shot image information. After that, the information addition process at the imaging apparatus 1 ends.

<Information Addition Process at Mobile Terminal 2>

At Step S141, the communication control unit 92 controls the first communication unit 20-2 to receive the application launch instruction transmitted from the imaging apparatus 1 via BLE. Upon receiving the application launch instruction, the application management unit 93 launches the application.

At Step S142, the communication control unit 92 controls the first communication unit 20-2 to receive the location information acquisition trigger, the file name of the shot image which is the shot image information and the setting information transmitted from the imaging apparatus 1 via BLE. The automatic transmission management unit 91 manages operations of the communication control unit 92 or the like according to the received setting information.

At Step S143, the information acquisition unit 94 acquires the location information which is a result of location measurement by the GPS unit 23-2 in the case that the selected kind of the supplementary information is "location information".

At Step S144, the automatic transmission management unit 91 determines whether or not the apparatus-side image transmission setting function has been selected in the received automatic transmission setting.

In the case that the apparatus-side image transmission setting function has been selected, the determination at Step S144 is "YES" and the process proceeds to Step S145.

At Step S145, the communication control unit 92 controls the second communication unit 21-2 to turn on Wi-Fi at the ST (Station) mode.

At Step S146, the communication control unit 92 controls the second communication unit 21-2 to search the imaging apparatus 1 of the access point (AP).

At Step S147, the communication control unit 92 determines whether or not the imaging apparatus 1 of the access point (AP) is found.

In the case that the imaging apparatus 1 of the access point (AP) is found (or, connection with the imaging apparatus 1 is already established), the determination at Step S147 is "YES" and the process proceeds to Step S150. Step S150 and the subsequent steps will be described later.

In the case that the imaging apparatus 1 of the access point is not found, the determination at Step S147 is "NO" and the process proceeds to Step S148.

At Step S148, the communication control unit 92 determines whether or not a predetermined period of time has elapsed and the connection timeout occurs.

In the case that the connection timeout does not occur, the determination at Step S148 is "NO" and the process returns to Step S147.

In the case that the connection timeout occurs, the determination at Step S148 is "YES" and the process proceeds to Step S149.

At Step S149, the communication control unit 92 turns off Wi-Fi for communication with the imaging apparatus 1 by the second communication unit 21-2 and the process returns to Step S141.

At Step S150, the communication control unit 92 controls the second communication unit 21-2 to perform communication by the second communication method using the Wi-Fi technology, connect to the imaging apparatus 1 of the access point (AP), and send the notification of connection to the imaging apparatus 1 (in other words, the connection for communication with the imaging apparatus 1 is established).

At Step S151, the communication control unit 92 controls the second communication unit 21-2 to receive the image transmitted from the imaging apparatus 1. The received image is stored in the image storage unit 111.

At Step S152, the information addition unit 95 adds the supplementary information (for example, the location information) to an image corresponding to the shot image information. After that, the information addition process at the mobile terminal 2 ends.

On the other hand, in the case that the apparatus-side image transmission setting function has not been selected (in other words, the terminal-side information reception setting function has been selected), the determination at Step S144 is "NO" and the process proceeds to Step S153.

At Step S153, the communication control unit 92 controls the first communication unit 20-2 to transmit the location information and the shot image information to the imaging apparatus 1. The location information transmitted to the imaging apparatus 1 is added to an image to the shot image information as the supplementary information. After that, the information addition process at the mobile terminal 2 ends. The location information and the shot image information are held in the case that the BLE communication is disconnected and retransmitted when the connection is reestablished.

As described above, the camera (the imaging apparatus 1) and the smart phone (the mobile terminal 2 which is the external apparatus) are connected by the high-speed communication method for image transmission and the communication method of low power consumption enabling consistent connection for control information exchange. With the shooting instruction at the imaging apparatus 1, the following operations are performed: (1) transmitting, to the mobile terminal 2 which is the external apparatus, the instruction information (the location information acquisition trigger) for instructing to acquire the location information (the supplementary information) at the time of the shooting instruction to be added to a shot image and the identification information for identifying the shot image which will be transmitted later; and (2) controlling the mobile terminal 2 to add to an image transmitted via the high speed communication the location information corresponding to the image based on the shot image information.

Further, in the case that the automatic transmission has not been selected, the following operation is performed: (3) transmitting, to the mobile terminal 2 which is the external apparatus, the instruction information (the location information acquisition trigger) for instructing the mobile terminal 2 to transmit the acquired supplementary information to the imaging apparatus 1 via the low-power-consumption communication.

<Second Embodiment>

Figure 9:
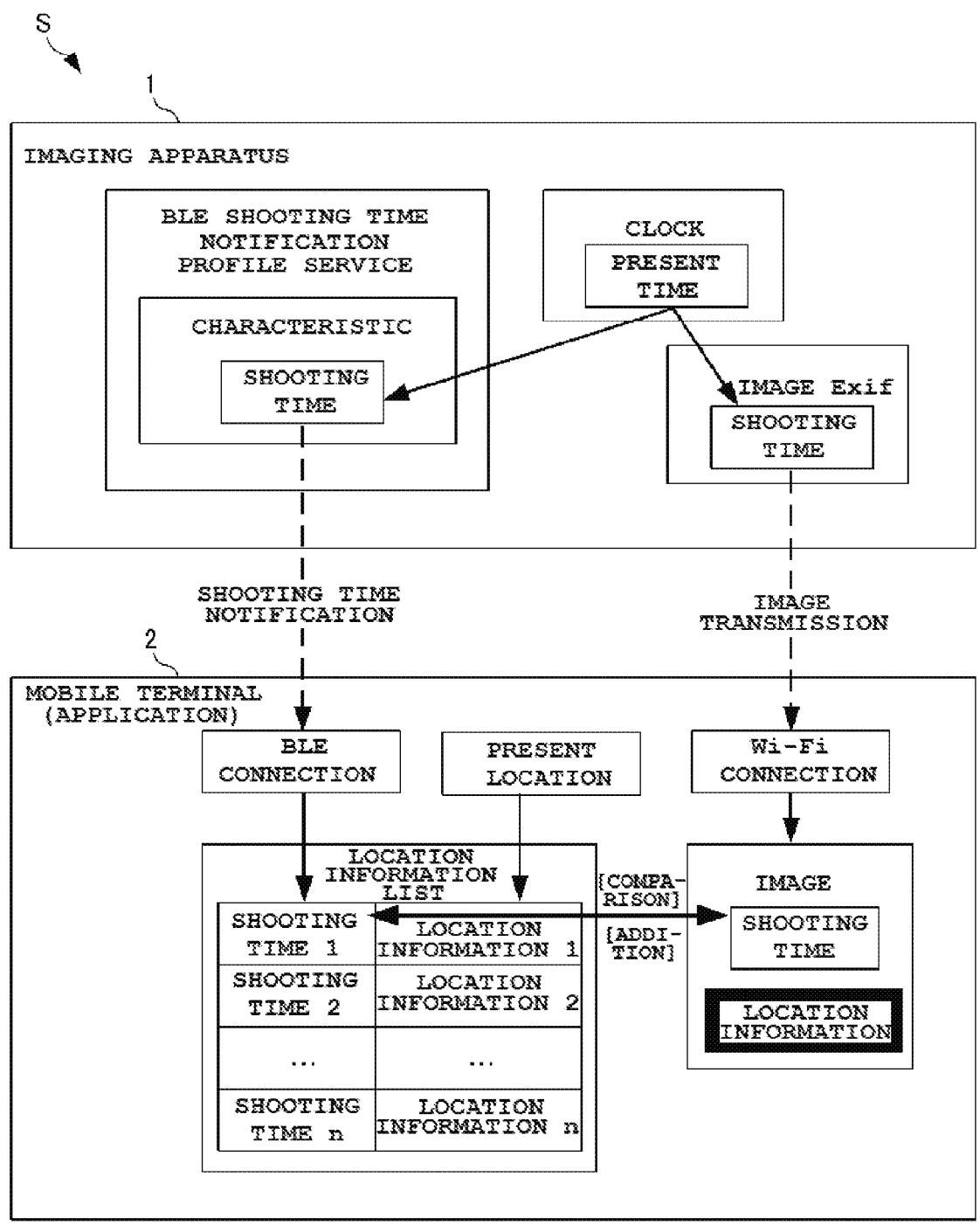
FIG. 9 is a schematic diagram for showing of an outline of addition of information according to a second embodiment of the present invention.

FIG. 9 is a schematic diagram for showing of an outline of addition of information according to a second embodiment of the present invention.

As shown in FIG. 9, according to the addition of information according to the present embodiment, the imaging apparatus 1 does not acquire location information for a shot image and the mobile terminal 2 adds location information of high accuracy to the image (more specifically, the Exif area of the image).

More specifically, a BLE profile service for notification of shooting time is prepared in the imaging apparatus 1 to notify the mobile terminal 2 of the shooting time when shooting an image.

The mobile terminal 2 is notified of the shooting time, acquires location information, and draws up a list including a plurality of sets of shooting time data and corresponding location information data (hereinafter, referred to as a "location information list").

In the case that an image is transmitted from the imaging apparatus 1 to the mobile terminal 2, the shooting time of the image is compared with the shooting time data in the location information list and the location information data corresponding to the shooting time is added to the image such that the image includes the location information.

In the present embodiment, a positional relationship between the imaging apparatus 1 and the mobile terminal 2 guarantees short-range communication between them via BLE and it is premised that the mobile terminal 2 is located near the imaging apparatus 1 at the time of shooting.

The shooting time can be unique information generated consistently every time. Thus, there is no necessity to allocate the identification information for specifying the image and hold and manage the unique identification information in the imaging apparatus 1 and the mobile terminal 2. In other words, the shooting time (time information added to the shot image) serves both as the instruction information and the identification information for identifying the shot image.

Figure 10:
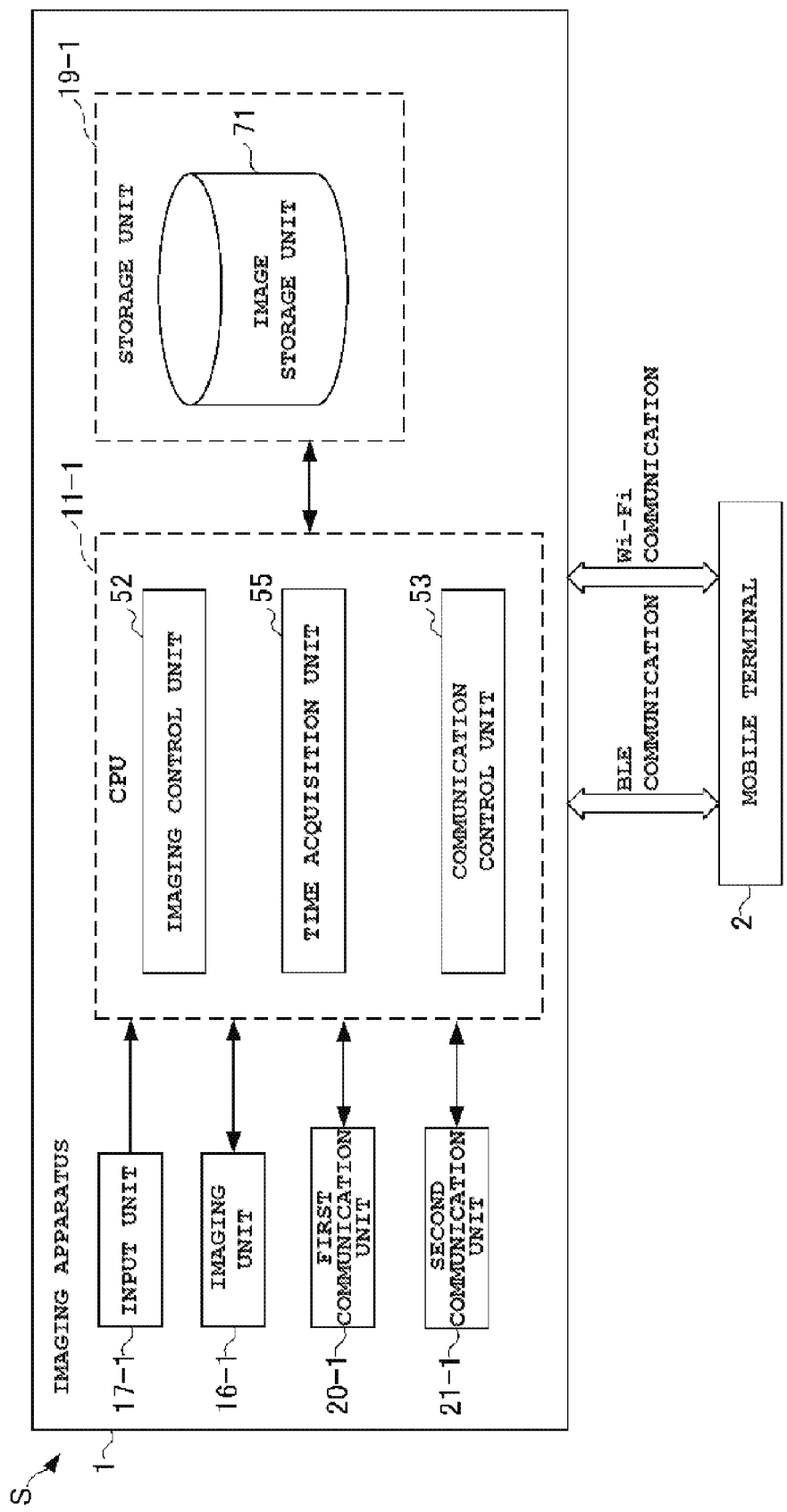
FIG. 10 is a functional block diagram for showing a functional configuration of the imaging apparatus 1 of FIG. 2A for executing an information addition process.

FIG. 10 is a functional block diagram for showing a functional configuration of the imaging apparatus 1 of FIG. 2A for executing an information addition process.

The information addition process of the present embodiment means a series of actions taken in order to add the location information to an image corresponding to the shooting time at the imaging apparatus 1. Location information acquired around the time of shooting an image can be regarded as the location information of the image under the condition that the BLE communication between the imaging apparatus 1 and the mobile terminal 2 has been established which guarantees that they are close to each other. Thus, the location information of high accuracy acquired by the mobile terminal 2 can be added to the image. Further, it is possible to prevent a waste of power of the imaging apparatus 1 for location measurement.

In the case that the information addition process is executed at the imaging apparatus 1, an imaging control unit 52, a time acquisition unit 55, and a communication control unit 53 of the CPU 11-1 function as shown in FIG. 10.

In an area of the storage unit 19-1, an image storage unit 71 is configured.

In the image storage unit 71, image data acquired from the imaging unit 16-1 is stored.

The imaging control unit 52 controls the imaging unit 16-1 to execute the image shooting process based on manipulation to instruct shooting input by the user through the input unit 17-1.

The time acquisition unit 55 acquires time information on the time when the imaging unit 16 executes the image shooting process, i.e. an image is shot and generated (hereinafter, referred to as "shooting time").

The communication control unit 53 controls the first communication unit 20-1 and the second communication unit 21-1 to perform communication. More specifically, the communication control unit 53 controls the first communication unit 20-1 to perform communication with the mobile terminal 2 by the first communication method using the BLE technology and transmit the acquired shooting time to the mobile terminal 2. Further, the communication control unit 53 controls the second communication unit 21-1 to perform communication with the mobile terminal 2 by the second communication method using the Wi-Fi technology and transmit the shot image to the mobile terminal 2.

Figure 11:
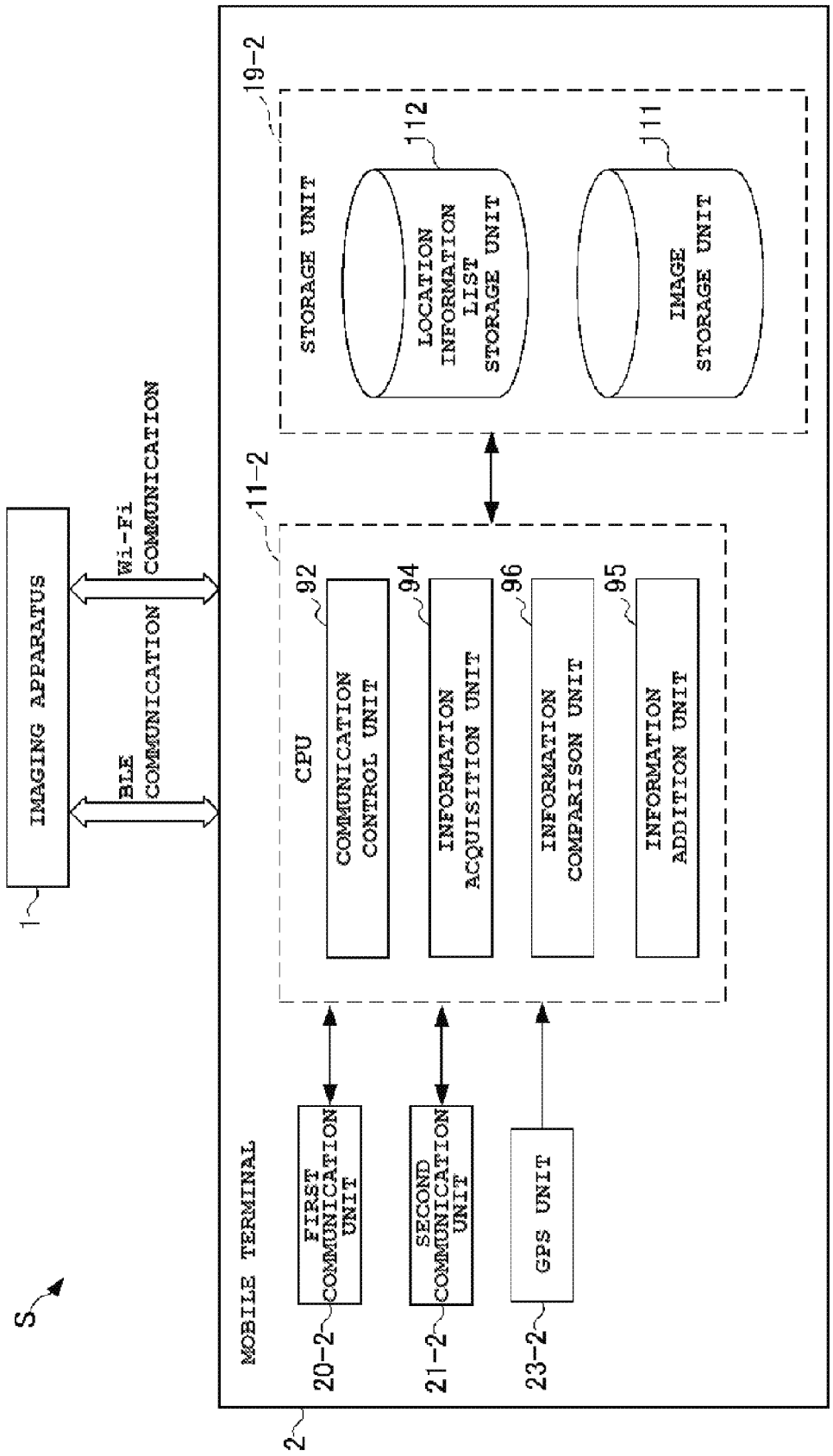
FIG. 11 is a functional block diagram for showing a functional configuration of the mobile terminal 2 of FIG. 2B for executing the information addition process.

FIG. 11 is a functional block diagram for showing a functional configuration of the mobile terminal 2 of FIG. 2B for executing the information addition process.

In the case that the information addition process is executed at the mobile terminal 2, a communication control unit 92, an information acquisition unit 94, an information comparison unit 96, and an information addition unit 95 of the CPU 11-2 function as shown in FIG. 11.

In an area of the storage unit 19-2, a location information list storage unit 112 and an image storage unit 111 are configured.

In the location information list storage unit 112, the location information list is stored in which the shooting time acquired from the imaging apparatus 1 corresponds to the location information acquired by the location measurement at the corresponding time.

In the image storage unit 111, image data acquired from the imaging apparatus 1 is stored.

The communication control unit 92 controls the first communication unit 20-2 and the second communication unit 21-2 to perform communication. More specifically, the communication control unit 92 controls the first communication unit 20-2 to receive the shooting time transmitted from the imaging apparatus 1 via the BLE communication. Further, the communication control unit 92 controls the second communication unit 21-2 to receive the image transmitted from the imaging apparatus 1.

The information acquisition unit 94 acquires the location information from the GPS unit 23-2. More specifically, the information acquisition unit 94 allows the acquired location information to be stored in the location information list storage unit 112. In the location information list, the received shooting time is recorded in correspondence with the acquired location information.

The information comparison unit 96 compares the shooting time of an image with the shooting time data of the location information list stored in the location information list storage unit 112. More specifically, the information comparison unit 96 compares the shooting time of the received image with the shooting time data of the location information list and determines whether or not the location information list includes the shooting time data which is the same as the shooting time of the image.

The information addition unit 95 adds the location information to the image. More specifically, the information addition unit 95 adds to the image the location information recorded in the location information list corresponding to the shooting time data which is determined to be the same as the shooting time of the image by the information comparison unit 96.

Figure 12:
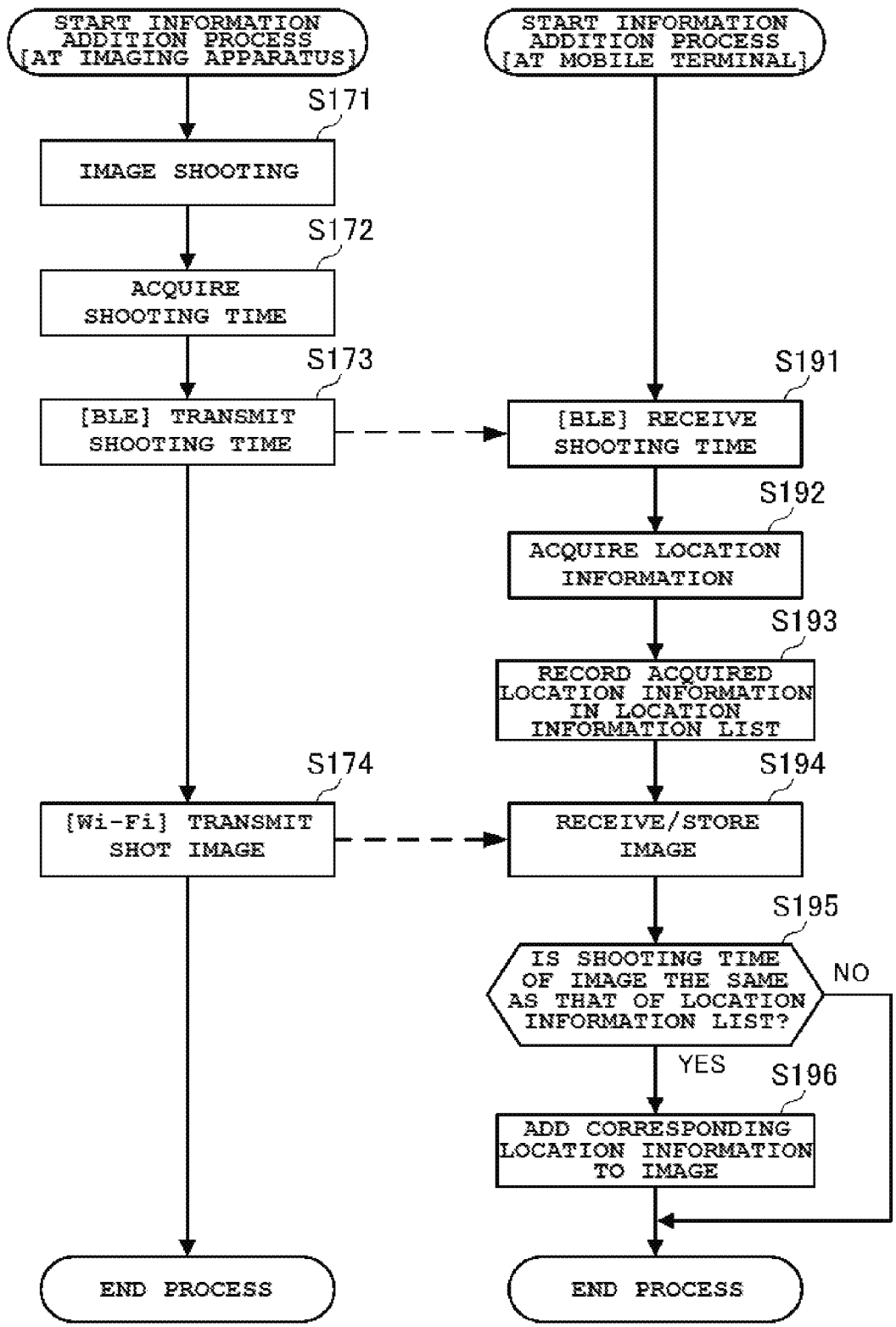
FIG. 12 is a flow chart for showing steps of the information addition process executed by the imaging apparatus 1 of FIG. 2A and the mobile terminal 2 of FIG. 2B including the functional configurations shown in FIGS. 10 and 11, respectively.

FIG. 12 is a flow chart for showing steps of the information addition process executed by the imaging apparatus 1 of FIG. 2A including the functional configuration shown in FIG. 10 and the mobile terminal 2 of FIG. 2B including the functional configuration shown in FIG. 11. Before the information addition process starts, pairing between the imaging apparatus 1 and the mobile terminal 2 is completed by the first communication method using the BLE technology and thus they are consistently connected via BLE. While the second communication method using the Wi-Fi technology is inactive (i.e. the off state) then, the imaging apparatus 1 and the mobile terminal 2 acquire the Wi-Fi configuration (i.e. the profile) of each other to establish one-to-one communication connection when transmitting an image. Thus, the image is automatically transmitted from the imaging apparatus 1 to the mobile terminal 2.

<Information Addition Process at Imaging Apparatus 1>

At Step S171, the imaging control unit 52 controls the imaging unit 16-1 to execute the image shooting process in response to the image shooting instruction. As a result, a captured image is output from the imaging unit 16-1. The imaging processing is performed for the output captured image and the shot image is stored in the image storage unit 71.

At Step S172, the time acquisition unit 55 acquires shooting time when the image shooting process is executed by the imaging unit 16-1.

At Step S173, the communication control unit 53 controls the first communication unit 20-1 to communicate with the mobile terminal 2 by the first communication method using the BLE technology and to transmit the acquired shooting time to the mobile terminal 2.

At Step S174, the communication control unit 53 controls the second communication unit 21-1 to communicate with the mobile terminal 2 by the second communication method using the Wi-Fi technology and to transmit the shot image to the mobile terminal 2. After that, the information addition process at the imaging apparatus 1 ends.

<Information Addition Process at Mobile Terminal 2>

At Step S191, the communication control unit 92 controls the first communication unit 20-2 to receive the shooting time transmitted from the imaging apparatus 1 by the BLE communication.

At Step S192, the information acquisition unit 94 acquires the location information which is a result of the location measurement by the GPS unit 23-3 in the case that the selected kind of the supplementary information is "location information".

At Step S193, the information acquisition unit 94 allows the acquired location information to be stored in the location information list storage unit 112. In the location information list, the received shooting time is recorded in correspondence with the acquired location information.

At Step S194, the communication control unit 92 controls the second communication unit 21-2 to receive the image transmitted from the imaging apparatus 1. The received image is stored in the image storage unit 111.

At Step S195, the information comparison unit 96 compares the shooting time of the received image with the shooting time data of the location information list and determines whether or not the location information list includes the shooting time data which is the same as the shooting time of the image.

In the case that the location information list does not include the shooting time data which is the same as the shooting time of the image, the determination at Step S195 is "NO" and the information addition process at the mobile terminal 2 ends.

In the case that the location information list includes the shooting time data which is the same as the shooting time of the image, the determination at Step S195 is "YES" and the process proceeds to Step S196.

At Step S196, the information addition unit 95 adds the location information recorded in the location information list corresponding to the shooting time to the image. After that, the information addition process at the mobile terminal 2 ends.

According to the present embodiment, an image can be managed by using the shooting time without requiring one ID such as the file name of the image because a plurality of times of shooting cannot be performed at the same time. In the case that the shooting time transmitted from the imaging apparatus 1 is the same as that previously stored, the old one may be deleted and the shooting time may be updated on the assumption that the clock of the imaging apparatus 1 is adjusted.

Conventionally, two methods for adding location information to an image have been known: (i) in the first method, a GPS in an imaging apparatus (for example, a camera) acquires the location information and the location information is added to the image by the imaging apparatus; and (ii) in the second method, the location information is acquired by a GPS logger or a mobile terminal (for example, a smart phone) other than the imaging apparatus (the camera) and added to the image by a device other than the imaging apparatus (the camera).

According to the method (i) for adding the location information by the imaging apparatus 1 (the camera), power consumption of the GPS is high and the operation time of the imaging apparatus 1 (the camera) is shortened. Further, accuracy of the location information is not good due to restrictions of installation of the GPS antenna.

According to the method (ii) for adding the location information by a device other than the imaging apparatus (the camera), the location information should be acquired continually because the device cannot recognize when an image is shot. Thus, current consumption and processing load of the device are high. Further, since determination of which location information to be added to which image is based on matching of time of the imaging apparatus (the camera) and the device, the clocks of the imaging apparatus (the camera) and the device should be adjusted such that they are matched.

In the information addition system S of the present invention, the imaging apparatus 1 (the camera) notifies the application of the mobile terminal 2 (the smart phone) of the shooting time of an image via BLE at the time of shooting the image. The application performs operations to acquire the location information at the time of being notified of the shooting time via BLE, store the location information and the notified shooting time, receive image data from the imaging apparatus 1 (the camera), and, in the case that the shooting time recorded in the image is the same as the notified shooting time, add to the image the location information stored in correspondence with the shooting time.

In summary, the information addition system S performs the following operations:

The BLE profile is prepared for notification of the shooting time in the imaging apparatus 1 (the camera).

The imaging apparatus 1 (the camera) notifies the application of the shooting time recorded in the image at the time of shooting via BLE.

The imaging apparatus 1 (the camera) does not notify the same shooting time repeatedly.

The application acquires the location information at the time of being notified of the shooting time via BLE and stores the location information and the notified shooting time in the location information list.

The application can store a plurality of sets of the shooting time and the location information in the location information list.

In the case that the application is notified of shooting time the same as that previously stored (for example, the clock of the imaging apparatus 1 (the camera) is adjusted), new location information is acquired and stored and the old one is deleted.

The application receives image data from the imaging apparatus 1 (the camera) and, in the case that the shooting time recorded in the image is the same as the notified shooting time, adds to the image the location information stored in correspondence with the shooting time.

By the features described above, the information addition system S achieves the following effects:

Since the imaging apparatus 1 (the camera) does not acquire any location information, current consumption of the imaging apparatus 1 (the camera) is not affected.

Since the location information is acquired by the mobile terminal 2 (the smart phone), accuracy of the location information is high.

Since the location information is acquired when the application receives the BLE notification, current consumption and processing load are lower than those of the conventional method of continually acquiring the location information.

Since the imaging apparatus 1 (the camera) does not notify the same shooting time repeatedly, communication load for the BLE notification is low in the case of adding the location information to images having the same shooting time such as sequentially shot images.

Since the process of adding the location information and the shooting are not performed at the same time, the image shooting process is not interrupted.

Since an image edited by the imaging apparatus 1 (the camera) (such as a resized or trimmed image) has the same shooting time as that of its original image, the same location information can be added to the edited image as the original image when the edited image is transmitted to the mobile terminal 2 (the smart phone).

The imaging apparatus 1 configured as described above includes the imaging control unit 52, the first communication unit 20-1, and the communication control unit 53.

The imaging control unit 52 acquires an image captured by the imaging unit 16-1 to generate a shot image.

The first communication unit 20-1 transmits the location information acquisition trigger, which is instruction information, to the mobile terminal 2, which is an external apparatus, to instruct the mobile terminal 2 to acquire supplementary information to be added to the shot image generated by the imaging control unit 52 which is information acquired by a sensor of the mobile terminal 2.

With a shooting instruction, the communication control unit 53 controls the imaging control unit 52 to generate the shot image and the first communication unit 20-1 to transmit the location information acquisition trigger which is the instruction information to the mobile terminal 2, which is the external apparatus, to instruct the mobile terminal 2 to acquire the supplementary information at the time of the shooting instruction.

By this, the imaging apparatus 1 can acquire the supplementary information at the time of the shooting instruction even in the case that it does not have a device or a sensor for acquiring information to be added to the shot image.

Further, the imaging apparatus 1 further includes the second communication unit 21-1 for transmitting the shot image generated by the imaging control unit 52 to the mobile terminal 2, which is the external apparatus.

The location information acquisition trigger, which is the instruction information, may further include an instruction for instructing the mobile terminal 2, which is the external apparatus, to add the supplementary information acquired by the mobile terminal 2 to the shot image.

With the shooting instruction, the communication control unit 53 controls the second communication unit 21-1 to transmit the shot image generated by the imaging control unit 52 to the mobile terminal 2, which is the external apparatus, and controls the first communication unit 20-1 to transmit the location information acquisition trigger, which is the instruction information, to the mobile terminal 2 to instruct the mobile terminal 2 to acquire the supplementary information to be added to the shot image transmitted by the second communication unit 21-1 and to add the acquired supplementary information to the transmitted shot image.

By this, the mobile terminal 2, which is the external apparatus, can add information to the shot image and it is possible to acquire the information to be added to the shot image efficiently.

The first communication unit 20-1 further transmits the shot image information which is identification information for identifying the shot image transmitted by the second communication unit 21-1 to the mobile terminal 2.

With the shooting instruction, the communication control unit 53 controls the first communication unit 20-1 to transmit further the shot image information, which is the identification information, to the mobile terminal 2 which is the external apparatus.

By this, it is possible to add to the shot image information corresponding to the image reliably.

The location information acquisition trigger, which is the instruction information, further includes an instruction for instructing the mobile terminal 2, which is the external apparatus, to transmit the supplementary information acquired by the mobile terminal 2 to the imaging apparatus 1, which is an image shooting apparatus.

With the shooting instruction, the communication control unit 53 controls the first communication unit 20-1 to transmit the location information acquisition trigger, which is the instruction information, to the mobile terminal 2 to instruct the mobile terminal 2 to transmit the acquired supplementary information to the imaging apparatus 1 which is the image shooting apparatus.

By this, it is possible to control the mobile terminal 2 to automatically transmit the supplementary information to the imaging apparatus 1. Thus, the information to be added to the image can be acquired efficiently.

Further, the imaging apparatus 1 further includes the automatic transmission setting unit 51 for setting whether or not the second communication unit 21-1 automatically transmits the shot image generated by the imaging control unit 52 to the mobile terminal 2, which is the external apparatus.

With the shooting instruction, the communication control unit 53 controls the second communication unit 21-1 to transmit the shot image generated by the imaging control unit 52 to the mobile terminal 2, which is the external apparatus, and controls the first communication unit 20-1 to transmit the location information acquisition trigger to the mobile terminal 2 to instruct the mobile terminal 2 to acquire the supplementary information to be added to the transmitted shot image and to add the acquired supplementary information to the shot image, in the case that the automatic transmission setting unit 51 sets to automatic transmission. On the other hand, in the case that the automatic transmission setting unit 51 does not set to the automatic transmission, the communication control unit 53 controls the first communication unit 20-1 to transmit the location information acquisition trigger, which is the instruction information, to the mobile terminal 2, which is the external apparatus, to instruct the mobile terminal 2 to acquire the supplementary information to be added to the shot image and to transmit the acquired supplementary information to the imaging apparatus 1, which is the image shooting apparatus.

By this, the user can set whether or not to automatically transmit the image to the mobile terminal 2 arbitrarily. Further, even in the case that the user does not set to the automatic transmission, it is possible to add the supplementary information to the image reliably.

The location information acquisition trigger, which is the instruction information, further includes the kind of the supplementary information to be acquired by the mobile terminal 2, which is the external apparatus.

With the shooting instruction, the communication control unit 53 controls the first communication unit 20-1 to further transmit the location information acquisition trigger, which is the instruction information, to the mobile terminal 2, which is the external apparatus, to instruct the mobile terminal 2 to acquire the supplementary information of the designated kind.

By this, it is possible to acquire various kinds of supplementary information to be added to the shot image efficiently.

The communication control unit 53 controls the first communication unit 20-1 to transmit the shooting time which is time information at the time of generating the shot image by the imaging unit 16-1 as the instruction information.

By this, it is unnecessary to perform adjustment for matching of the clocks of the imaging apparatus 1 and the mobile terminal 2 and transmission of the shot image and the shooting time suffices.

The imaging unit 16-1 adds further the shooting time to the generated shot image.

The communication control unit 53 controls the first communication unit 20-1 to transmit the shooting time with the instruction information to the mobile terminal 2 as the identification information for identifying the shot image transmitted by the second communication unit 21-1.

By this, even in the case that a plurality of images are sequentially shot and they are transmitted, it is unnecessary to transmit information for identifying the images separately.

The instruction information transmitted by the first communication unit 20-1 is acquired by the mobile terminal 2 prior to the shot image transmitted by the second communication unit 21-1.

By this, it is possible to add the supplementary information at the time of the shooting instruction to the shot image efficiently.

The communication control unit 53 controls the second communication unit 21-1 to transmit the shot image via Wi-Fi.

The communication control unit 53 controls the first communication unit 20-1 to transmit the instruction information via BLE.

By this, it is possible to realize initiation of the instruction and transmission of the image at high speed and with low power consumption.

The mobile terminal 2 includes the GPS unit 23-2.

The communication control unit 92 controls the second communication unit 21-2 to receive the shot image information transmitted from the imaging apparatus 1.

The communication control unit 92 controls the first communication unit 20-2 to receive the instruction information transmitted from the imaging apparatus 1 for instructing to acquire the supplementary information to be added to the shot image received by the second communication unit 21-2.

The information acquisition unit 94 acquires the supplementary information by the GPS unit 23-2 according to the instruction information received by the first communication unit 20-2.

The information addition unit 95 adds the supplementary information acquired by the information acquisition unit 94 to the shot image received by the second communication unit 21-2.

By this, it is possible to add information to an image shot by the imaging apparatus 1 which is an external apparatus and to acquire the information to be added to the shot image with precision and efficiently.

In the second embodiment, the mobile terminal 2 may include the sensor unit 24-2 similarly with the first embodiment and acquire environment information around the imaging apparatus 1 by various sensors such as a temperature sensor, a pressure sensor, and an illuminance sensor, as well as the location information by the GPS. Further, information may be acquired from a web page related to the sensor information. In the case that an external apparatus has special information (for example, a sensor detects an abnormal value), the information may be transmitted to the imaging apparatus 1 to be added to an image or added to a received image according to decisions of the external apparatus.

The communication control unit 92 controls the first communication unit 20-2 to receive the shooting time which is the time information at the time of generating the shot image transmitted from the imaging apparatus 1 as the instruction information.

The information acquisition unit 94 acquires the supplementary information by the GPS unit 23-2 in response to the reception of the shooting time transmitted from the imaging apparatus 1.

By this, it is unnecessary to perform adjustment for matching of the clocks of the imaging apparatus 1 and the mobile terminal 2 and transmission of the shot image and the shooting time suffices.

The communication control unit 92 controls the first communication unit 20-2 to receive the shooting time transmitted from the imaging apparatus 1 as the identification information for identifying the shot image received by the second communication unit 21-2.

The information addition unit 95 identifies the shot image to which the supplementary information acquired by the information acquisition unit 94 is to be added by comparing the shooting time added to the shot image received by the second communication unit 21-2 and the shooting time received by the first communication unit 20-2 which serves as the identification information.

By this, even in the case that a plurality of images are sequentially shot and they are transmitted, it is unnecessary to transmit information for identifying the images separately.

The mobile terminal 2 further includes the location information list storage unit 112 for storing a plurality of sets of the shooting time received by the first communication unit 20-2, which serves as the identification information, and corresponding supplementary information acquired by the information acquisition unit 94.

The information addition unit 95 compares the shooting time added to the shot image received by the second communication unit 21-2 and the shooting time stored in the location information list storage unit 112, which serves as the identification information, to identify the shot image to which the supplementary information stored in correspondence with the shooting time is to be added.

By this, it is possible to prevent the supplementary information from being added wrong in the case that the order of reception of shot images changes.

The location information list storage unit 112 updates the supplementary information to new one acquired by the information acquisition unit 94 in the case that the shooting time received by the first communication unit 20-2, which serves as the identification information, is the same as the shooting time stored in correspondence with the supplementary information.

By this, it is possible to deal with the case in which the clock of the imaging apparatus 1 is adjusted.

The instruction information received by the first communication unit 20-2 is acquired prior to the shot image received by the second communication unit 21-2.

By this, it is possible to add the supplementary information at the time of the shooting instruction to the shot image efficiently.

The one kind of the information which can be acquired by the mobile terminal 2 which is the external apparatus is the location information.

By this, it is possible to acquire information to be added to the shot image efficiently even in the case that the imaging apparatus 1 does not have a function for acquiring the location information.

In addition, the present invention is not limited to the embodiments described above and various modifications and alternatives which can achieve the objects of the invention fall within the scope of the present invention.

The external apparatus may be a smart phone, a personal computer, an image shooting apparatus such as a different digital camera, or a server. The communication may be performed by NFC, via the public communication line, or the like.

In other embodiments of the present application, the imaging apparatus does not have the automatic transmission function and has only the functions for instructing the external apparatus to transmit the supplementary information to the imaging apparatus and adding the received supplementary information to shooting information.

While the supplementary information is transmitted from the external apparatus to the imaging apparatus via BLE in the above embodiments, the supplementary information may be transmitted via Wi-Fi in other embodiments.

Further, a plurality of kinds of the supplementary information may be acquired by the external apparatus. An additional kind of the supplementary information may be added to the instruction information according to shooting situations at the time of the shooting instruction.

According to the above embodiments, the shot image is transmitted after the instruction information for acquisition of the supplementary information is transmitted. However, the transmission of the instruction information and the transmission of the shot image can be performed at the same time if the supplementary information can be received by the information acquiring apparatus prior to completion of the transmission of the shot image.

Further, in the embodiments above described, timing of the transmission of the shot image does not have to be the same as that of the transmission of the instruction information for acquisition of the supplementary information. Therefore, the transmission of the instruction information and the transmission of the shot image may be performed in sequence by one communication line (for example, via only Wi-Fi).

The identification information may be any information which can identify the shot image. In some embodiments, the external apparatus records the time of reception of the instruction information and compares the time with the time information included in the shot image received later.

In the above embodiments, the location information is also added to an image edited by the imaging apparatus 1 (such as a resized or trimmed image). If the edited image has the same shooting time as that of its original image, the same location information can be added to the edited image.

In the above embodiments, the image shooting process causes the location information to be acquired. In other embodiments, the location information is acquired regardless of shooting and the location information is added to an image in the case that shooting time of the image is the same as the time of acquiring the location information.

The embodiments of the present invention can be applied to a moving picture as well as a still picture.

Further, in the embodiments described above, the present invention has been applied to a digital camera as an example of the imaging apparatus 1 without limitation.

For example, the present invention can be applied to general electronic devices having the function of information addition processing. More specifically, the present invention can be applied to a notebook type personal computer, a printer, a television, a video camera, a portable navigation device, a mobile phone, a smart phone, a portable game device, and the like.

Each of the process sequences described above can be executed by hardware or software.

In other words, the functional configurations shown in FIGS. 4, 5, 9 and 10 are merely examples and the present invention is not limited thereto. The imaging apparatus 1 suffices if it has a function for performing each of the process sequence as a whole. Functional blocks to use to implement this function are not limited to the embodiments of FIGS. 4, 5, 9, and 10.

In addition, a functional block may be configured by a piece of hardware, a piece of software, or their combination.

In the case that the sequence is performed by software, a program configuring the software is installed in a computer or the like from a network or a storage medium.

The computer may be a computer which is incorporated in dedicated hardware. In addition, the computer may be a computer capable of executing various functions by installing various programs therein, for example, a general-purpose personal computer.

A storage medium for recording such a program may include not only the removable media 31 shown in FIGS. 2A and 2B which is distributed separately from the apparatus's main body to provide it to users, but also a storage medium or the like which is provided to users in a state of being incorporated in the apparatus's main body in advance. The removable media 31 includes, for example, a magnetic disk (including a floppy disk), an optical disc, a magneto-optical disk, or the like. For example, the optical disc includes a compact disk-read only memory (CD-ROM), a digital versatile disk (DVD), a Blu-ray (Registered Trademark) disc, or the like. The magneto-optical disk includes a Mini-Disk (MD), or the like. In addition, the storage medium which is provided to the users in a state of being incorporated in the apparatus's main body in advance includes, for example, the ROM 12 in FIGS. 2A and 2B in which a program is recorded, a hard disk included in the storage unit 19 in FIGS. 2A and 2B, or the like.

Further, in the description presented here, the steps describing a program recorded in a recording medium include not only processes to be executed serially in time in order, but also processes which are not necessarily executed serially in time but in a parallel manner or individually.

In addition, the term "system" as used herein means an entire apparatus including a plurality of apparatus and/or a plurality of units.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. An image shooting apparatus comprising:
an imaging unit;
a transmission unit; and
a processor that is configured to acquire an image captured by the imaging unit to generate a shot image and control the transmission unit to transmit, to an information acquiring apparatus, (i) the shot image, and (ii) instruction information for instructing the information acquiring apparatus to acquire supplementary information, with a shooting instruction,
wherein the supplementary information is information which is acquired by a sensor of the information acquiring apparatus and which is to be added to the transmitted shot image,
wherein the processor is configured to further set whether or not to automatically transmit the shot image to the information acquiring apparatus, and
control the transmission unit to transmit, to the information acquiring apparatus, (i) the shot image and the instruction information in the case that the setting is automatic transmission, and (ii) instruction information, which is different from the instruction information of (i), for instructing the information acquiring apparatus to acquire supplementary information to be added to the shot image by the image shooting apparatus and transmit the supplementary information to the image shooting apparatus in the case that the setting is not the automatic transmission, with the shooting instruction.

2. The image shooting apparatus of claim 1, wherein the instruction information further includes an instruction to add the supplementary information acquired by the information acquiring apparatus to the shot image received by the information acquiring apparatus.

3. The image shooting apparatus of claim 2, wherein the instruction information further includes the kind of the supplementary information to be acquired by the information acquiring apparatus.

4. The image shooting apparatus of claim 1, wherein the instruction information further includes shooting time which is time information at the time of generating the shot image.

5. An image shooting apparatus comprising:
an imaging unit;
a transmission unit; and
a processor that is configured to acquire an image captured by the imaging unit to generate a shot image and control the transmission unit to transmit, to an information acquiring apparatus, (i) the shot image, and (ii) instruction information for instructing the information acquiring apparatus to acquire supplementary information, with a shooting instruction,
wherein the supplementary information is information which is acquired by a sensor of the information acquiring apparatus and which is to be added to the transmitted shot image,
wherein the transmission unit comprises an image transmission unit configured to transmit the shot image via a communication medium of high-speed and an instruction information transmission unit configured to transmit the instruction information via a communication medium of low power consumption.

6. The image shooting apparatus of claim 5, wherein the processor is configured to further control the transmission unit to further transmit identification information for identifying the shot image to be transmitted to the information acquiring apparatus, with the shooting instruction.

7. The image shooting apparatus of claim 6, wherein the instruction information further includes shooting time which is time information at the time of generating the shot image, and
the processor is configured to further add shooting time to the shot image and control the transmission unit to transmit the shooting time added to the shot image to the information acquiring apparatus as identification information for identifying the shot image to transmit.

8. The image shooting apparatus of claim 5, wherein the instruction information further includes an instruction to transmit the supplementary information acquired by the information acquiring apparatus to the image shooting apparatus.

9. The image shooting apparatus of claim 5, wherein the processor is configured to further control the transmission unit to transmit the instruction information to the information acquiring apparatus prior to completion of the transmission of the shot image.

10. The image shooting apparatus of claim 5, wherein the information acquired by the sensor of the information acquiring apparatus is location information.

11. An information acquiring apparatus comprising:
a sensor;
a reception unit; and
a processor that is configured to:
control the reception unit to receive a shot image and instruction information transmitted from an image shooting apparatus; and
perform processing to acquire supplementary information by the sensor and add the supplementary information to the received shot image according to the received instruction information,
wherein the reception unit comprises an image reception unit configured to receive the shot image via a communication medium of high-speed and an instruction information reception unit configured to receive the instruction information via a communication medium of low power consumption.

12. The information acquiring apparatus of claim 11, wherein the instruction information includes time information at the time of generating the shot image transmitted from the image shooting apparatus, and
the processor is configured to acquire the supplementary information by the sensor in response to reception of the instruction information including shooting time.

13. The information acquiring apparatus of claim 12, wherein the shot image transmitted from the image shooting apparatus includes shooting time added thereto, and
the processor is configured to further identify the shot image to which the acquired supplementary information is to be added, by comparing the shooting time added to the received shot image and the shooting time included in the received instruction information.

14. The information acquiring apparatus of claim 13 further comprising a corresponding information storage unit configured to store a plurality of sets of the shooting time included in the received instruction information and corresponding supplementary information acquired by the sensor,
wherein the processor is configured to compare the shooting time added to the received shot image and the shooting time stored in the corresponding information storage unit to identify the shot image to which the supplementary information stored in correspondence with the shooting time is to be added.

15. The information acquiring apparatus of claim 14, wherein the processor is configured to further update the supplementary information stored in the corresponding information storage unit to new one acquired by the sensor in the case that the shooting time included in the received instruction information is the same as the shooting time stored in correspondence with the supplementary information in the corresponding information storage unit.

16. The information acquiring apparatus of claim 11, wherein the instruction information is received prior to the shot image.

17. The information acquiring apparatus of claim 11, wherein the information acquired by the sensor is location information.

18. An information acquiring system comprising:
an image shooting apparatus; and
an information acquiring apparatus,
the image shooting apparatus comprising:
an imaging unit;
a transmission unit; and
a processor that is configured to acquire an image captured by the imaging unit to generate a shot image and control the transmission unit to transmit, to the information acquiring apparatus, (i) the shot image, and (ii) instruction information for instructing the information acquiring apparatus to acquire supplementary information, with a shooting instruction, wherein the supplementary information is information which is acquired by a sensor of the information acquiring apparatus and which is to be added to the transmitted shot image, and
the information acquiring apparatus comprising:
a sensor;
a reception unit; and
a processor that is configured to:
control the reception unit to receive the shot image and the instruction information transmitted from the image shooting apparatus; and
perform processing to acquire supplementary information by the sensor and add the supplementary information to the received shot image according to the received instruction information, wherein the transmission unit comprises an image transmission unit configured to transmit the shot image via a communication medium of high-speed and an instruction information transmission unit configured to transmit the instruction information via a communication medium of low power consumption, and
the reception unit comprises an image reception unit configured to receive the shot image via the communication medium of high-speed and an instruction information reception unit configured to receive the instruction information via the communication medium of low power consumption.

19. The information acquiring system of claim 18, wherein the information acquired by the sensor is location information.

20. A transmission control method comprising:
acquiring an image captured by an imaging unit to generate a shot image and controlling a transmission unit to transmit, to an information acquiring apparatus, (i) the shot image, and (ii) instruction information for instructing the information acquiring apparatus to acquire supplementary information at the time of generating the shot image, with a shooting instruction,
transmitting the shot image by a transmission unit via a communication medium of high-speed,
transmitting the instruction information by an instruction information transmission unit via a communication medium of low power consumption,
wherein the supplementary information is information which is acquired by a sensor of the information acquiring apparatus and which is to be added to the transmitted shot image.

21. An information acquiring method comprising:
controlling a reception unit comprising an image reception unit and an instruction information reception unit to receive a shot image via a communication medium of high-speed and instruction information via a communication medium of low power consumption transmitted from an image shooting apparatus; and
performing processing to acquire supplementary information by a sensor and add the supplementary information to the received shot image according to the received instruction information.

* * * * *